(12) United States Patent
Hildreth et al.

(10) Patent No.: US 8,514,251 B2
(45) Date of Patent: Aug. 20, 2013

(54) ENHANCED CHARACTER INPUT USING RECOGNIZED GESTURES

(75) Inventors: Evan Hildreth, Ottawa (CA); Francis MacDougall, Ottawa (CA)

(73) Assignee: Qualcomm Incorporated, San Diego, CA (US)

( * ) Notice: Subject to any disclaimer, the term of this patent is extended or adjusted under 35 U.S.C. 154(b) by 791 days.

(21) Appl. No.: 12/144,252

(22) Filed: Jun. 23, 2008

(65) Prior Publication Data
US 2009/0315740 A1 Dec. 24, 2009

(51) Int. Cl.
*G06T 1/00* (2006.01)

(52) U.S. Cl.
USPC ........... 345/635; 345/619; 345/629; 345/636; 341/20

(58) Field of Classification Search
USPC ................... 341/20; 345/619, 629, 635–636
See application file for complete search history.

(56) References Cited

U.S. PATENT DOCUMENTS

| | | | | |
|---|---|---|---|---|
| 5,594,469 A * | 1/1997 | Freeman et al. | | 345/158 |
| 5,701,424 A * | 12/1997 | Atkinson | | 715/808 |
| 5,745,165 A | 4/1998 | Atsuta et al. | | |
| 5,805,167 A * | 9/1998 | van Cruyningen | | 715/808 |
| 6,028,600 A * | 2/2000 | Rosin et al. | | 715/718 |
| 6,072,494 A * | 6/2000 | Nguyen | | 715/863 |
| 6,094,197 A * | 7/2000 | Buxton et al. | | 715/863 |
| 6,144,366 A | 11/2000 | Numazaki et al. | | |
| 6,160,899 A | 12/2000 | Lee et al. | | |
| 6,414,700 B1 * | 7/2002 | Kurtenbach et al. | | 715/810 |
| 6,750,848 B1 * | 6/2004 | Pryor | | 345/168 |
| 6,827,579 B2 | 12/2004 | Burdea et al. | | |
| 7,018,211 B1 | 3/2006 | Birkhölzer et al. | | |
| 7,176,945 B2 * | 2/2007 | Ohba | | 345/629 |
| 7,418,671 B2 * | 8/2008 | Hama et al. | | 715/830 |
| 7,629,959 B2 * | 12/2009 | Kitaura | | 345/156 |
| 7,644,372 B2 * | 1/2010 | Russo | | 715/834 |
| 7,661,075 B2 * | 2/2010 | Lahdesmaki | | 715/841 |
| 7,676,763 B2 * | 3/2010 | Rummel | | 715/841 |
| 7,730,425 B2 * | 6/2010 | de los Reyes et al. | | 715/835 |
| 7,873,911 B2 * | 1/2011 | Gopalakrishnan | | 715/764 |
| 7,886,229 B2 * | 2/2011 | Pachet | | 715/726 |
| 2002/0006222 A1 | 1/2002 | Inagaki et al. | | |
| 2004/0221243 A1 * | 11/2004 | Twerdahl et al. | | 715/834 |
| 2005/0212767 A1 | 9/2005 | Marvit et al. | | |
| 2005/0229116 A1 * | 10/2005 | Endler et al. | | 715/862 |
| 2005/0239028 A1 | 10/2005 | Wu et al. | | |
| 2005/0271279 A1 | 12/2005 | Fujimura et al. | | |

(Continued)

OTHER PUBLICATIONS

International Search Report & Written Opinion, issued in International Application No. PCT/US09/35544, dated Jul. 21, 2009, 7 pages.

(Continued)

*Primary Examiner* — Adi Amrany
(74) *Attorney, Agent, or Firm* — Kilpatrick Townsend & Stockton LLP

(57) ABSTRACT

Enhanced character input using recognized gestures, in which a user's first and second gestures are recognized, and a control including radially disposed interaction elements is output. At least a portion of the interaction elements are associated with clusters of characters. When an interaction element is selected, the characters associated with the selected interaction element are disposed radially in relation to the selected interaction element. Using the control, the interaction element and a character associated with the selected interaction element are selected based on the user's recognized first and second gestures, respectively, and the selected character is output.

25 Claims, 22 Drawing Sheets

(56) References Cited

U.S. PATENT DOCUMENTS

| | | |
|---|---|---|
| 2006/0010400 A1 | 1/2006 | Dehlin et al. |
| 2006/0101016 A1 | 5/2006 | Uehara |
| 2006/0125785 A1 | 6/2006 | McAlindon |
| 2006/0164386 A1 | 7/2006 | Smith et al. |
| 2006/0182346 A1 | 8/2006 | Yoda et al. |
| 2007/0057912 A1 | 3/2007 | Romriell et al. |
| 2007/0234223 A1* | 10/2007 | Leavitt et al. ............ 715/762 |
| 2008/0013826 A1 | 1/2008 | Hillis et al. |
| 2008/0030460 A1 | 2/2008 | Hildreth et al. |
| 2008/0036743 A1 | 2/2008 | Westerman et al. |
| 2008/0089587 A1 | 4/2008 | Kim |
| 2008/0141181 A1 | 6/2008 | Ishigaki et al. |
| 2009/0019397 A1* | 1/2009 | Buffet et al. ............ 715/837 |
| 2009/0327955 A1* | 12/2009 | Mouilleseaux et al. ...... 715/810 |
| 2009/0327964 A1* | 12/2009 | Mouilleseaux et al. ...... 715/834 |
| 2010/0306702 A1* | 12/2010 | Warner ............ 715/811 |

OTHER PUBLICATIONS

International Search Report & Written issued in International Application No. PCT/US09/35555, mailed Jul. 28, 2009, 7 pages.

International Search Report & Written Opinion issued in International Application No. PCT/US09/48271, mailed Aug. 14, 2009, 11 pages.

* cited by examiner

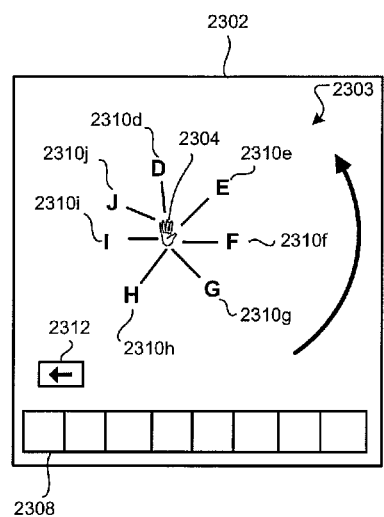
FIG. 23C
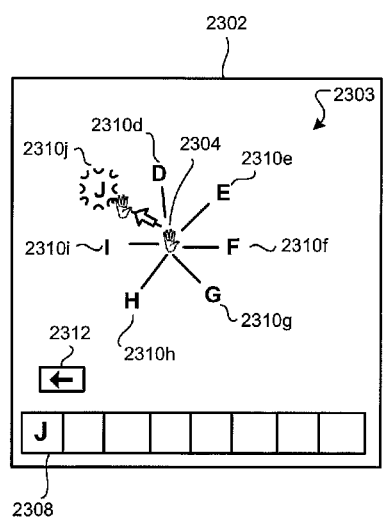 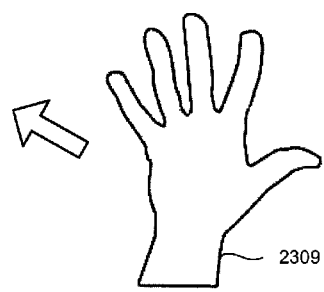
FIG. 23D

ENHANCED CHARACTER INPUT USING RECOGNIZED GESTURES

FIELD

The present disclosure generally relates to controls, sometimes referred to as widgets.

BACKGROUND

An input device or pointing device is a hardware component that allows a computer user to input data into a computer. A control, sometimes referred to as a widget, is an interface element that the computer user interacts with, such as by using an input device, to provide a single interaction point for the manipulation of data.

SUMMARY

According to one general implementation, a user may interact with an enhanced on-screen control to select characters, such as alphanumeric characters, by performing certain gestures that are capable of automatic recognition, based on accessing images of the user at various times. Among other features, the control may display icons that initially surround a representation of the user, such as a hand symbol or cursor, effecting the easy selection of characters or clusters of characters through straightforward, intuitive, and natural motions of the user's body.

According to another general implementation, a process includes recognizing a user's first and second gestures, and outputting a control including radially disposed interaction elements, at least a portion of which are associated with clusters of characters, and, when an interaction element is selected, the characters associated with the selected interaction element, disposed radially in relation to the selected interaction element. The process also includes selecting, using the control, the interaction element and a character associated with the selected interaction element, based on the user's recognized first and second gestures, respectively, and outputting the selected character.

Implementations may include one or more of the following features. For instance, a representation of the user may be displayed in a central region of the control, where the interaction elements may be radially disposed in relation to the central region. Selecting the interaction element and the at least one of the selected interaction element's associated characters using the control may further include interacting with the control. A quantity of interaction elements may be dynamically determined. Each character may represent an alphabetic character, a numeric character, or a symbol character. The interaction elements may also include a first interaction element associated with alphabetic characters only, a second interaction element associated with numeric characters only, and a third interaction element associated with symbolic characters only.

In other examples, the radially disposed interaction elements may further include a first interaction element associated with a cluster of characters, and a second interaction element associated with a function. The function may be a character deletion function or a default function. Selecting the interaction element may further include determining whether the user's recognized first gesture exceeds a predetermined magnitude. Outputting the control may further include hiding the selected interaction element's associated characters when the user's recognized first gesture moves away from the selected interaction element.

In additional examples, the process may include recognizing a users third and fourth gestures, and outputting, as the control, supplemental interaction elements disposed radially in relation to the output selected character, of which at least a portion are associated with additional clusters of characters, and, when a supplemental interaction element is selected, the selected supplemental interaction element's associated characters disposed radially in relation to the selected supplemental interaction element. The process may further include selecting, using the control, the supplemental interaction element and one of the selected supplemental interaction element's associated characters, based on the user's recognized third and fourth gestures, respectively, and outputting the one of the selected supplemental interaction element's associated characters.

In additional examples, the process may also include hiding the output radially disposed interaction elements, or dynamically determining the characters associated with each cluster. The user's first gesture may be recognized from images of the user. The users gesture may be a single or multiple finger gesture; a single hand gesture; a single hand and arm gesture; a single hand and arm, and body gesture; a bimanual gesture; a change in a head pose or posture; a change in an eye position; a change in facial expression; or a change in a body pose or posture.

Another example is a circular hand motion made by extending the user's arm in front of their face, and moving their arm in a circle in front of their head. In essence, an engagement gesture specifies to the device that generates the user interface that the user is ready for further camera-based input to occur. To reduce errors, an engagement gesture may be an atypical gesture, such as a gesture that would not subconsciously be made with body language during an a normal conversation, or a gesture that would not be made in the ordinary performance of normal human activity.

In further examples, the radially disposed interaction elements may include a first interaction element associated with characters: A, B, C, D, E, and F, a second interaction element associated with characters: G, H, I, J, K, and L, a third interaction element associated with characters: M, N, O, P, Q, and R, a fourth interaction element associated with characters: S, T, U, V, W, and X, a fifth interaction element associated with symbolic characters and characters: Y and Z; and a sixth interaction element associated with a backspace function. A visual indicia of the clusters of characters associated with the each interaction element may be displayed in association with each interaction element.

In another general implementation, a computer readable medium is encoded with a computer program. The computer program includes instructions that, when executed, operate to cause a computer to recognize a user's first and second gestures, and to output a control that further includes radially disposed interaction elements, at least a portion of which are associated with clusters of characters, and, when an interaction element is selected, the characters associated with the selected interaction element, disposed radially in relation to the selected interaction element. The computer program also includes instructions to select, using the control, the interaction element and a character associated with the selected interaction element, based on the users recognized first and second gestures, respectively, and output the selected character.

According to a further general implementation, a device includes a user interface and a processor. The user interface is configured to output a control that further includes radially disposed interaction elements, at least a portion of which are associated with clusters of characters, and, when an interaction element is selected, characters associated with the selected interaction element, disposed radially in relation to the selected interaction element. The processor is configured to recognize a user's first and second gestures, select, using the control, the interaction element and a character associated with the selected interaction element, based on the user's recognized first and second gestures, respectively, and output the selected character. The device may also include a camera configured to generate images of the user, where the user's first and second gestures are recognized from the generated images.

According to another general implementation, a computer readable medium is encoded with a computer program that includes instructions. When executed, the instructions operate to cause a computer to perform operations including recognizing a user's gesture, outputting a control that further comprises radially disposed interaction elements, each of which are associated with a character, selecting, using the control, an interaction element based on the users recognized gesture, and outputting the character associated with the selected interaction element.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers represent corresponding parts throughout.

DETAILED DESCRIPTION

Figure 1:
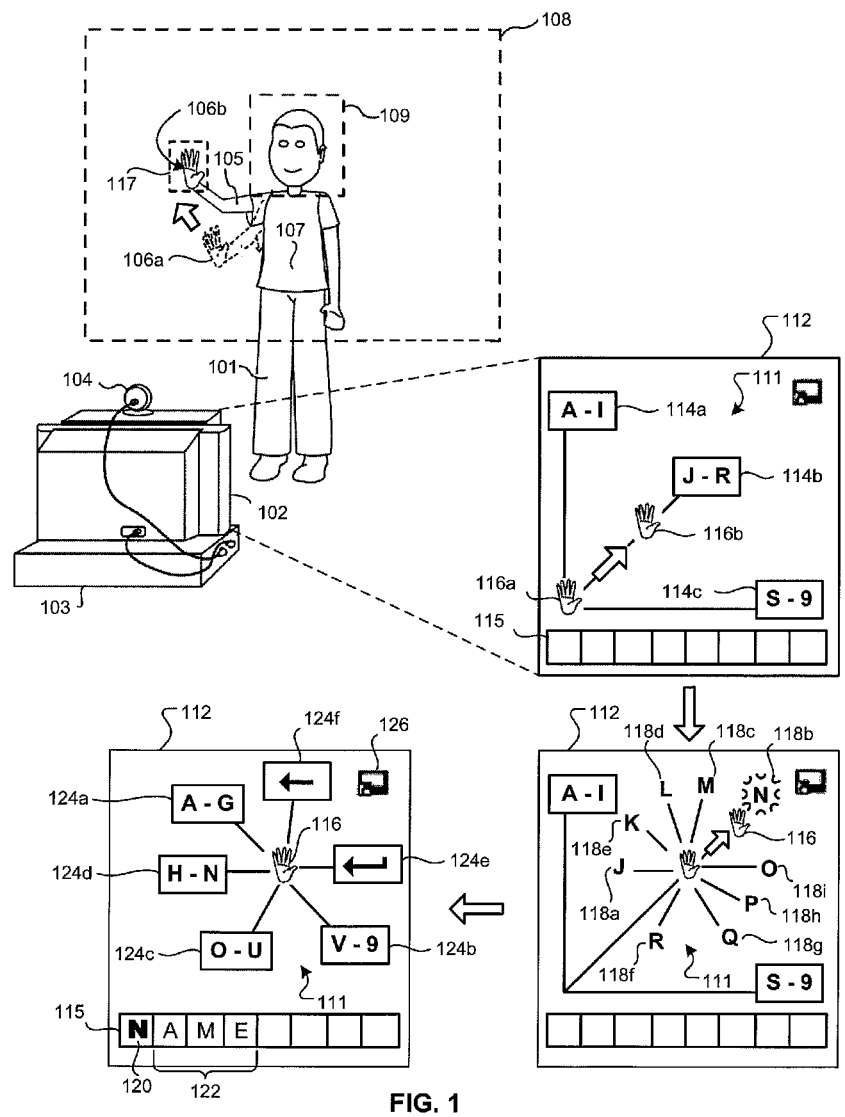
FIG. 1 is a contextual diagram demonstrating enhanced character input using recognized gestures.

As described herein, a user may interact with an enhanced on-screen control to select characters, such as alphanumeric characters, by performing certain gestures that are capable of automatic recognition, based on accessing images of the user at various times. Among other features, the control may display icons that initially surround a representation of the user, such as a hand symbol or cursor, effecting easy selection of characters or clusters of characters through straightforward, intuitive, and natural motions of the user's body. The gesture may be detected within images of the users, without requiring a manipulation of or physical contact with an input device.

A camera may be used to control a media computer or hub, using the enhanced control described herein, based on the recognition of gestures or changes in gestures of a user. Unlike touch-screen systems that suffer from the deleterious, obscuring effect of fingerprints, gesture-based input allows characters, icons, photos, videos, or other images to be clearly displayed or otherwise output based on the user's natural body movements or poses. With this potential advantage in mind, the enhanced control may be extended to recognize other gestures that manipulate visual output in other ways, such as to intuitively invoke other media applications or other functions such as functions that play music or other sounds, to interact with other applications, to enter character input or interact with controls or widgets, or to navigate in virtual environments or universes.

The control may be displayed following the performance of an engagement gesture by the user. An engagement gesture activates or invokes functionality that monitors other images for gesture-based command inputs, and that ignores, filters or excludes random, unintentional or other body motions that do not define command inputs, or background motions.

As used herein throughout, a "gesture" is intended to refer to a form of non-verbal communication made with a whole or part of a human body or multiple human bodies, and is contrasted with verbal communication such as speech. For instance, a gesture may be defined by a movement, change or transformation between a first position, pose, or expression and a second pose, position or expression. Common gestures used in everyday discourse include for instance, an "air quote" gesture, a bowing gesture, a curtsey, a cheek-kiss, a finger or hand motion, a genuflection, a head bobble or movement, a high-five, a nod, a sad face, a raised fist, a salute, a swiping or wave motion, a thumbs-up motion, or a finger pointing gesture.

The engagement gesture may be a specific hand pose or hand motion sequence gesticulated in a tracking region of a camera in front of a display that is held for a predetermined amount of time. One example gesture is a hand pose held in an upright position with all fingers and thumb spread apart widely. Another example is a circular hand motion made by extending the users arm in front of their face, and moving their arm in a circle in front of their head. In essence, an engagement gesture specifies to the device that generates the user interface that the user is ready for further camera-based input to occur. To reduce errors, an engagement gesture may be an atypical gesture, such as a gesture that would not subconsciously be made with body language during an a normal conversation, or a gesture that would not be made in the ordinary performance of normal human activity.

Accordingly, from the two images, the gesture may be derived that defines an idea, opinion, emotion, communication, command, demonstration or expression of the user. For instance, the user's gesture may be a single or multiple finger gesture; a single hand gesture; a single hand and arm gesture; a single hand and arm, and body gesture; a bimanual gesture; a change in head pose or posture; a change in an eye position; a change in a facial expression; a change in a body pose or posture, or a transformation of any other expressive body state.

A gesture may be detected using a camera, such as by analyzing an image of a user, using a tilt sensor, such as by detecting an angle that a user is holding or tilting a device, or by any other approach. The camera used to recognize the gesture may be a depth camera, referred to as a time-of-flight camera, which may include infrared emitters and a sensor. The depth camera may produce a pulse of infrared light and subsequently measure the time it takes for the light to travel to an object and back to the sensor. A distance may be calculated based on the travel time.

A body part may make a gesture (or "gesticulate") by changing its position (i.e. a waving motion), or the body part may gesticulate without changing its position (i.e. by making a clenched fist gesture). Although the enhanced control uses, as examples, hand and arm gestures to effect the control of functionality using camera input, other types of gestures may also be used.

FIG. 1 is a contextual diagram demonstrating enhanced character input using recognized gestures. In FIG. 1, a user 101 ("Bob") is standing in front of a display 102 of a media hub 103 and a camera 104. The user's right arm 105, right hand 106, and torso 107 are within the field-of-view 108 of the camera 104. From a portion 109 of an image, the face of the user 101 is detected and recognized, identifying the user 101 as "Bob."

An enhanced control 111 is displayed in a user interface 112 (output on the display 102) to enable the user 101 to effect character input. A user may effect character input, for example, in the context of an application, such as to compose the text of an electronic mail message or to enter a web site address. In this example, the enhanced control 111 includes three radially disposed interaction elements 114a to 114c, each associated with a cluster of characters. For instance, interaction element 114a is associated with the characters 'A' through 'I', interaction element 114b is associated with the characters 'J' through 'R', and interaction element 114c is associated with the characters 'S' through '9'. The user may select (i.e., enter) a character by using one or more movement gestures. Entered or predicted characters may be displayed in a display area 115.

Although the enhanced control 111 is shown in this example as a two-dimensional hub-and-spoke shaped control with three spokes originating from the lower left corner, other control shapes and configurations are possible. For instance, the enhanced control 111 may include more or less spokes, may be linear, triangular, three-dimensional, square, or the enhanced control 111 may occupy a circular sector. The enhanced control 111 may be generally asymmetrical or symmetrical.

As used herein, a "cluster" of characters refers to more than one character, such as a cluster that represents the characters of the English alphabet, or some portion of an alphabet. Characters may be "clustered" based on a characteristic that allows the cluster to visually represent each character without outputting each character on the user interface. For instance, the ten characters of the English alphabet "A," "B," "C," "D," "E," "F," "G," "H," "I," and "J" may be clustered together, and visualized by an icon labeled "A to J." Other groupings can also occur based on other common characteristics or themes. For instance, a first cluster may include the characters "Q," "W," "E," "R," "T," and "Y," based on the layout of a keyboard, or vowel characters can be grouped as well. In either case, an icon or interaction element representing these clusters may not need to list out each individual character for a typical user to intuitively understand which characters the clusters represent.

Based upon a recognized upward-and-rightward movement gesture or motion of the arm 105, a representation 116 (in this case, a hand-shaped cursor) moves in the user interface 112 in an upward-and-rightward direction corresponding to the movement of the arm 105. For example, to enter an 'N' character, the user 101 gesticulates by extending his right arm 105 and right hand 106 toward the camera 104 and in front of his torso 107, and by moving his right arm 105 in an upward-and-rightward motion.

From a portion 117 of an image, a change of pose of the hand 106 from a first position 106a to a second position 106b is detected or otherwise determined, allowing for the automatic determination or recognition of the gesture performed by the upward-and-rightward arm motion of the arm 105. The representation 116 moves on the user interface 112 in an upward-and-rightward direction, corresponding to the movement of the arm 105, from a first position 116a to a second position 116b. As the user 101 continues to move his arm 105 in an upward-and-rightward direction, the representation 116 continues to move accordingly and eventually overlaps or becomes adjacent to the interaction element 114b, causing an interaction with the interaction element 114b.

The interaction with the interaction element 114b results in the hiding or disabling of the interaction element 114b. The interaction element 114b is replaced with a set of radially disposed supplemental interaction elements 118a to 118i, where each supplemental interaction element represents one or more of the characters associated with the interaction element 114b. For example, the supplemental interaction element 118a represents the 'J' character, and the supplemental interaction element 118b represents the 'N' character. The interaction elements 114a and 114c may remain displayed, allowing the user to "cancel" selecting a character associated with the interaction element 118b by navigating to and selecting the interaction element 118a or 118c. The process of replacing a selected interaction element with supplemental interaction elements may be referred to as "spawning" new interaction elements.

The user 101 continues to move his arm 105 in a rightward and upward direction to effect movement of the representation 116 towards the supplemental interaction element 118b. As the representation 116 overlaps or becomes adjacent to the supplemental interaction element 118b, an interaction with the supplemental interaction element 118b occurs, and the supplemental interaction element 118b may become highlighted to visually indicate the interaction. In this case, the interaction may be similar to a mouseover interaction.

The interaction with the supplemental interaction element 118b results in the display of an associated character in the display area 115 (i.e., to indicate that a character has been entered). For example, an 'N' character is displayed in a first cell 120 of the display area 115. As characters are entered, suggested words may be predicted and displayed in the display area 115 to "auto-complete" a partially-entered word. For example, in response to the user's entry of the 'N' character, additional characters "AME" 122 are displayed to suggest the word "NAME."

Suggested words may be determined based on popular usage. Various approaches may be used to determine word popularity. For example, word popularity may be dynamically determined based on a user's past history of word entry and/or word popularity may be pre-determined based on statistics indicating frequencies of word occurrence within a particular language.

The interaction with the supplemental interaction element 118b results in the hiding or disablement of the supplemental interaction element 118b and the subsequent display of interaction elements 124. Interaction elements 124a to 124d allow for the entry of an additional character. Interaction element 124f represents a backspace function which allows for the cancellation of the most recently entered character. Interaction element 124e represents an accept-entry (or "enter" or "return") function which allows for the completion of character entry (i.e., to signal that the characters displayed in the display area 115 are to be accepted as a completed entry). The accept-entry function may provide the entered text to an application (e.g., the entered text may be the address of a web site that a web browser application may load).

The number and placement of interaction elements may be determined dynamically, for instance based on available space in the user interface 112. Interaction elements may be placed so as to avoid other objects in the user interface 112.

For example, the interaction elements 124 are placed so as to avoid an icon 126. The number of interaction elements shown may be determined dynamically, resulting in a dynamic number of characters associated with an interaction element. For example, four interaction elements 124a-d may be used, as compared to three interaction elements 114a-c.

FIG. 1 has shown an example of how characters can be input using an enhanced control, based on recognizing a user's gestures from camera images. As illustrated in FIGS. 2, 6, 8, 9, 10, 12 and 16, this type of enhanced control can also be used to invoke other functionality, instead of or in addition to effecting the input of characters. Put another way, the input of characters is one type of functionality that may be performed by the enhanced control. As such, in the further examples below where the enhanced control is described or illustrated as associating functionality with an interaction element, the functionality associated with the interaction element may be a character input functionality, or some other functionality, such as an application invocation functionality.

Figure 2:
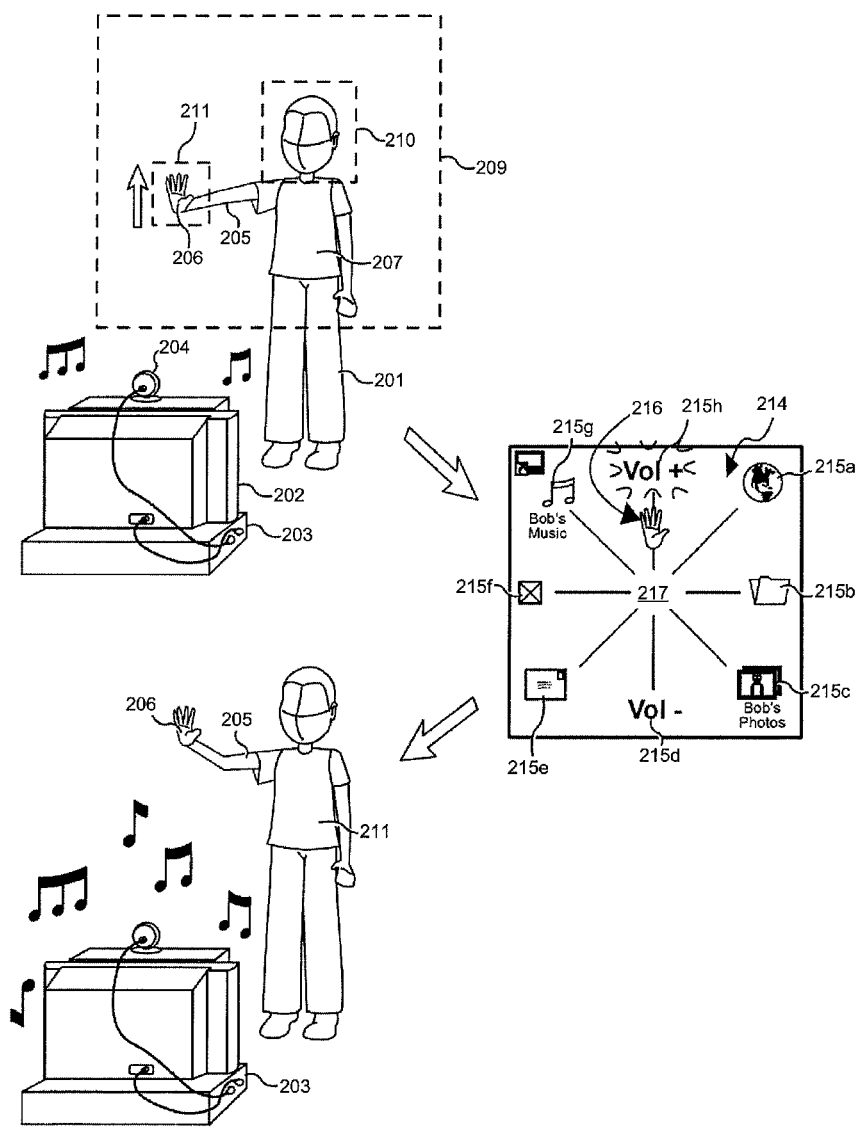
FIG. 2 demonstrates exemplary input using recognized gestures.

FIG. 2 is a contextual diagram demonstrating enhanced input using recognized gestures. In FIG. 2, a user 201 ("Bob") is standing in front of a display 202 of a media hub 203 and a camera 204, listening to music played at a soft volume. The user's right arm 205, right hand 206, and torso 207 are within the field-of-view 209 of the camera 204.

To indicate his desire to have the media hub 203 raise the volume of the music, the user 201 gesticulates by extending his right arm 205 and right hand 206 toward the camera 204 and in front of his torso 207, and moving his right arm 206 in an upward motion. The media hub 203 recognizes the palm-forward, finger extended pose of the user's right hand 206 as signifying that a gesture-based control input is forthcoming. Said another way, if the user's right hand 206 did not form the palm-forward, fingers extended pose (e.g. if the user's right hand 206 were curled in a ball), the media hum 203 may ignore the user's motions or gestures.

From a portion 210 of an image, the face of the user 201 is detected and recognized, identifying the user 201 as "Bob." From a portion 211 of the image, a pose of the hand 206, in this case a pose in which the palm is forward, and all five fingers are fully extended and separated, is detected. From a second image, the change in position of the hand 211 is also detected or otherwise determined, allowing for the automatic determination or recognition of the gesture performed by the upward arm motion of the arm 205.

An enhanced control 214 is displayed in a user interface 212. In this example, the wheel-shaped enhanced control 214 includes eight interaction elements 215, each associated with one or more icons, functions, applications, or characters. For instance, interaction element 215a is associated with a web browser function, interaction element 215c is associated with a user-specific photo album function, interaction element 215d is associated with a VOLUME DOWN function, interaction element 215e is associated with an e-mail function, interaction element 215f is associated with a DISABLE CONTROL function, interaction element 215g is associated with a user-specific music function, and interaction element 215h is associated with a VOLUME UP function. Other functions are possible, such as a function which allows character input by associating interaction elements with characters or clusters of characters. The interaction elements 215 may be universal to all users of the media hub 203, or they may be determined or selected based on a recognized identity ("Bob") of the user 201.

Although the enhanced control 214 is illustrated with a two-dimensional wheel with a hub-and-spoke appearance, in other implementations other shapes can be used. For instance, the enhanced control 214 may be linear, triangular, three-dimensional, square, or the enhanced control 214 may occupy a circular sector. The enhanced control 214 may be generally asymmetrical or symmetrical.

Additionally, the enhanced control 214 need not be aligned at the center of the user interface 212, or be fixed at a single position within the user interface 212 at all. For instance, as the user interface 212 displays other objects than the enhanced control or regions of the user interface 212 become obfuscated, the enhanced control may dynamically reposition itself, change its shape, or change the number of interaction elements displayed. Further, in addition to being dynamically chosen for a particular recognized user or may be uniformly selected for all users, and fewer or more then the illustrated number of interaction elements may be chosen.

Based upon the recognized 'upward motion of the arm 205' gesture, a representation 216 (in this case, a hand-shaped cursor) moves from central region 217 of the control 214 to overlap or be adjacent to interaction element 215h, thereby causing an interaction with the interaction element 215h. Such an interaction calls, invokes or otherwise executes the VOLUME UP function or application associated with the interaction element 215h, causing the volume of the music output by the media hub 203 to further increase.

Figure 3:
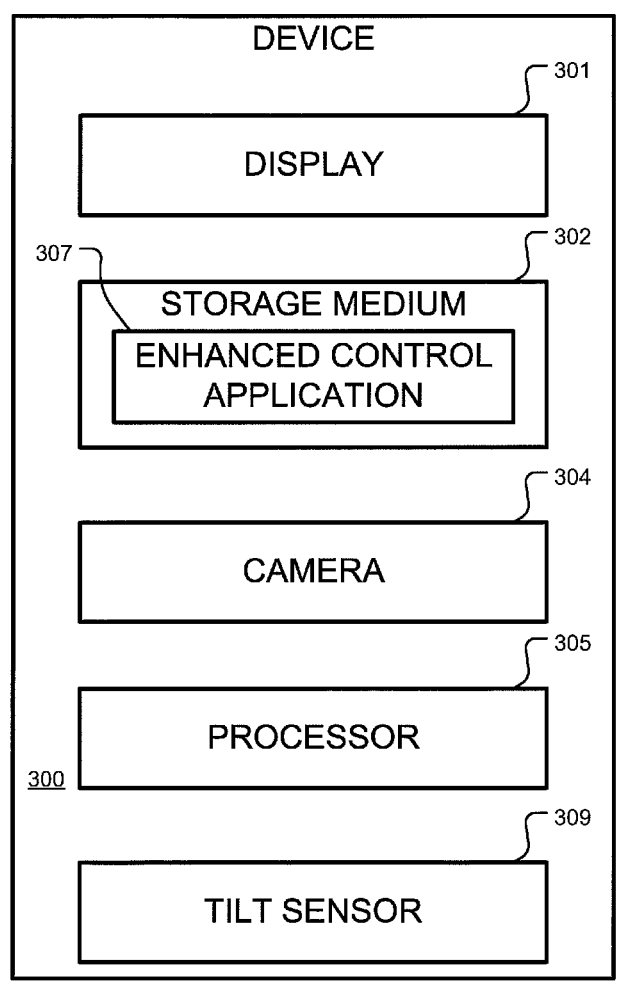
FIG. 3 is a block diagram of an exemplary device.

FIG. 3 is a block diagram of a device 300 used to implement enhanced input. Briefly, and among other things, the device 300 includes a display 301, a storage medium 302, a camera 304, a processor 305, and a tilt sensor. The display 301 is a mechanism for allowing a user to interact with the device 300, or with applications invoked by the device 300. The display 301 may provide a mechanism for both input and output, allowing a user to manipulate the device or for the device to produce the effects of the user's manipulation. The device 300 may utilize any type of display 301, such as a graphical user interface (GUI), a voice user interface, or a tactile user interface.

The display 301 may be configured to render a visual display image. For example, the display 301 may be a monitor, a television, a liquid crystal display (LCD), a plasma display device, a projector with a projector screen, an auto-stereoscopic display, a cathode ray tube (CRT) display, a digital light processing (DLP) display, or any other type of display device configured to render a display image. The display 301 may include one or more display devices. In some configurations, the display 301 may be configured to display images associated with an application, such as display images generated by an application, including an object or representation such as an avatar.

The storage medium 302 stores and records information or data, an may be an optical storage medium, magnetic storage medium, flash memory, or any other storage medium type. Among other things, the storage medium is encoded with an enhanced control application 307 that effects input of characters using recognized gestures. The storage medium 302 may include a look-up table or database that maps recognized gestures to selectable functions or characters.

The camera 304 is a device used to capture images, either as still photographs or a sequence of moving images. The camera 304 may use the light of the visible spectrum or with other portions of the electromagnetic spectrum, such as infrared. For example, the camera 304 may be a digital camera, a digital video camera, or any other type of device configured to capture images. The camera 304 may include one or more cameras. In some examples, the camera 304 may be configured to capture images of an object or user interacting with an application. For example, the camera 304 may be configured to capture images of a user or person physically gesticulating in free-space (i.e. the space surrounding the user's body), or otherwise interacting with an application within the field of view of the camera 304.

The camera 304 may be a stereo camera, a time-of-flight camera, or any other camera. For instance the camera 304 may be an image detector capable of sampling a background image in order to detect motions and, similarly, gestures of a user. The camera 304 may produce a grayscale image, color image, or a distance image, such as a stereo camera or time-of-flight camera capable of generating a distance image. A stereo camera may include two image sensors that acquire images at slightly different viewpoints, where a processor compares the images acquired from different viewpoints to calculate the distance of parts of the images. A time-of-flight camera may include an emitter that generates a pulse of light, which may be infrared light, where the time the pulse of light travels from the emitter to an object and back to a sensor is measured to calculate the distance of parts of the images.

The device 300 is electrically connected to and in operable communication with, over a wireline or wireless pathway, the camera 304 and the display 301, and is configured to control the operation of the processor 305 to provide for the enhanced control. In one configuration, the device 300 uses the processor 305 or other control circuitry to execute an application that provides for the enhanced camera-based input.

Although the device 300 has been described as a personal computer (PC) or set top box, such a description is made merely for the sake of brevity, and other implementations or manifestations are also contemplated. For instance, the device 300 may be implemented as a television, an ultra-mobile personal computer (UMPC), a mobile internet device (MID), a digital picture frame (DPF), a portable media player (PMP), a general-purpose computer (e.g., a desktop computer, a workstation, or a laptop computer), a server, a gaming device or console, a mobile telephone, a personal digital assistant (PDA), or any other type of electronic device that includes a processor or other control circuitry configured to execute instructions, or any other apparatus that includes a user interface.

In one example implementation, input occurs by using a camera to detect images of a user performing gestures. For instance, a mobile phone can be placed on a table and may be operable to generate images of a user using a face-forward camera. Alternatively, the gesture may be recognized or detected using the tilt sensor 309, such as by detecting a "tilt left" gesture to move a representation left and to select an interaction element disposed on the left side of a control, or by detecting a "tilt forward and right" gesture to move a representation up and to the right of a neutral position, to select an interaction element disposed on an upper right side of a control.

The tilt sensor 309 may thus be any type of module operable to detect an angular position of the device 300, such as a gyroscope, accelerometer, or a camera-based optical flow tracker. In this regard, image-based input may be supplemented with or replaced by tilt-sensor input to perform functions or commands desired by a user. Put another way, detection of a user's gesture may occur without using a camera. By moving the device in the same kind of stroke pattern that is visualized on the control on the user interface, the user is enabled to control the same interface or application in a straightforward manner.

In a computer-implemented process, first and second gestures of a user may be recognized from first and second images. The first and second images may be derived from individual image snapshots or from a sequence of images that make up a video sequence. Each image captures position information that allows an application to determine a pose, position, expression, stature, or other state of a user or portion of the user.

For brevity, the body part or parts used to perform relevant gestures are generally referred to as a "control object." For instance, the user may express a command using their entire body or with other physical objects, in which case their entire body or the other physical objects may be the control object. A user may more subtly express a command by blinking their eye, by flaring their nostrils, or by wiggling a finger, in which case the eyelid, nose, or finger may be the control object. The user's gesture in a single image or between two images may be expressive of an enabling or "engagement" gesture.

There are many ways of determining a user's gesture from a camera image. For instance, the gesture of "drawing a circle in the air" or "swiping the hand off to one side" may be detected by a gesture analysis and detection process using the hand, arm, body, head or other object position information. Although the gesture may involve a two- or three-dimensional position displacement, such as when a swiping gesture is made, in other instances the gesture includes a transformation without a concomitant position displacement. For instance, if a hand is signaling "stop" with five outstretched fingers and palm forward, the pose of the user changes if all five fingers are retracted into a ball with the palm remaining forward and thus a gesture is expressed, even if the overall position of the hand or arm remains static.

Gestures may be detected using heuristic techniques, such as by determining whether the hand position information passes explicit sets of rules. For example, the gesture of "swiping the hand off to one side" can be identified if the following gesture detection rules are satisfied: (1) the change in horizontal position is greater than a predefined distance over a time span that is less than a predefined limit; (2) the horizontal position changes monotonically over that time span; (3) the change in vertical position is less than a predefined distance over that time span; and (4) the position at the end of the time span is nearer to (or on) a border of the hand detection region than the position at the start of the time span.

Some gestures utilize multiple rule sets that are executed and satisfied in an explicit order, where the satisfaction of a rule set causes a system to change to a state where a different rule set is applied. This system may be unable to detect subtle gestures, in which case Hidden Markov Models may be used, as these models allow for chains of specific motions to be detected, but also consider the overall probability that the motions sufficiently fit a gesture.

An engagement gesture activates or invokes functionality that monitors other images for gesture-based command inputs, and ignores random or background body motions. In one example, the engagement gesture is a specific hand pose or hand motion sequence gesticulated in a tracking region of a camera in front of a display that is held for a predetermined amount of time. One example gesture is a hand pose in which the hand is held in an upright position with all fingers and thumb spread apart widely. A second example gesture is a circular hand motion made by extending the user's arm in front of their face, and moving their arm in a circle in front of their head.

In addition to body, arm, or hand gestures, finger pointing gestures can be recognized from one or more images. For instance, a "point left" gesture can be made with the tip of a user's finger and detected by analyzing an image of a finger. Fingerprint analysis or other approaches can be used to determine the direction of a pointing fingertip. In other example implementations, and as noted above, a gesture can be detected without using a camera, such as where the gesture is a verbal gesture or is detected using a tilt sensor or accelerometer.

Figure 4:
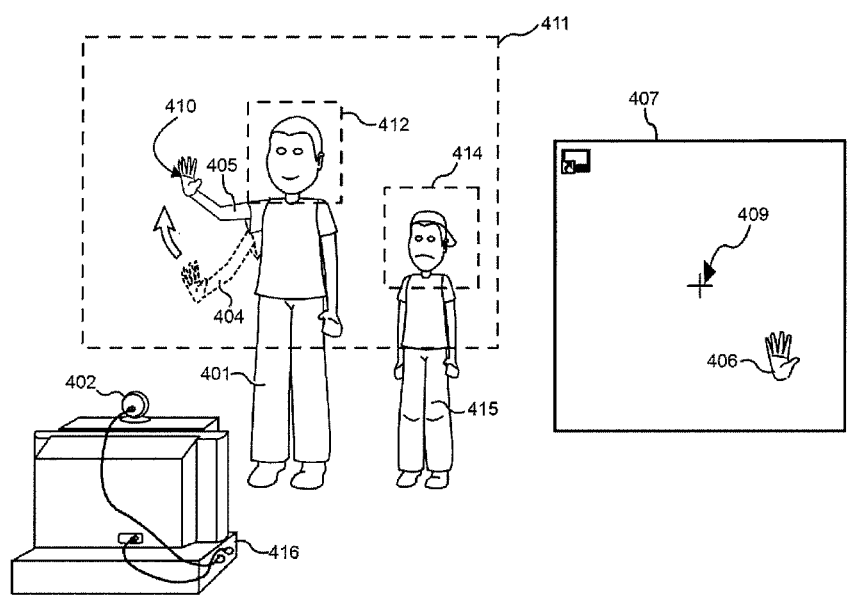
FIGS. 4, 7 to 10 and 12 to 15 illustrate exemplary gestures and concomitant control interactions.

FIG. 4 illustrates an exemplary engagement gesture and a user interface that results from the engagement gesture. In particular, two images of the user 401 captured by the camera 402 capture the user's arm gesticulating from a downward first position 404 to an extended, palm-facing-forward second position 405. The performance of this gesture by the user 401 causes a representation 406 of the user to be displayed within the user interface 407, as well as a target image 409 (crosshairs) to be displayed in the center of the user interface 407. As described in further detail below, since, upon performing the gesture, the hand 410 of the user is not centered in the field-of-view 411 of the camera 402, the representation 406 appears in the lower right corner of the user interface 407, potentially invoking a realignment process.

In addition to recognizing gestures or changes in gestures, other information may also be determined from the images. For example, a facial detection and recognition process may be performed on the images to detect the presence and identity of users within the image. Identity information may be used, for example, to determine or select available options or interaction elements to display, or to determine which of many users within an image is to be designated as a controlling user if more than one user is attempting to engage the input functionality.

In FIG. 4, a facial detection process identifies regions 412 and 414 that include faces, and a facial recognition process determines the identities of the adult user 401 and the child (or unidentified) user 415. From this determined identity information, the device may determine that a child is present or that the user 401 has a higher priority than the user 415, and may thus display fewer options to the user using the control, or may disallow the child user 415 from wresting control of the device 416 from the adult user 401.

If the user 401 has a higher priority than the user 415, the user 401 may make a gesture that transfers control to the user 415, or that authorizes the user 415 to wrest control. For instance, the user 401 may make a "pat on the head" gesture of user 415, thereby providing transferring control of the device to the user 415. Subsequent gestures by the user 401 until the user 401 regains control using active (e.g. re-gesticulating) measures or passive (e.g. time-out) measures.

In addition to selectively recognizing users' gestures based on the identity of the user, other criteria can be used to filter out irrelevant or unintentional "candidate" gestures, such as potential control gestures. For example, a plane may be defined at a predetermined distance in front of a camera, where gestures that are made or performed on the far side of the plane from the camera are ignored, while gestures or potential gestures that are performed between the camera and the plane are monitored, identified, recognized, filtered, and processed as appropriate. The plane may also be defined relative to another point, position or object, such as relative to the users torso.

So as to enable the input of complex commands and to increase the number of input options, the process for recognizing the user's gesture may further include recognizing a first displacement in a first direction, and recognizing a second displacement in a second direction, and aggregating these multiple displacements as a single gesture. Furthermore, the recognition of the user's gesture may determine a magnitude and direction of the user's gesture.

Figure 5:
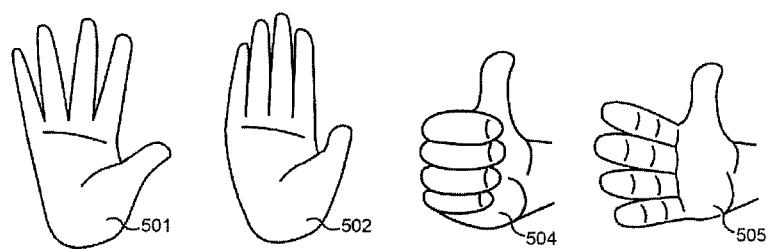
FIGS. 5 and 11 depict exemplary hand poses or gestures.

Although a fingers-extended, palms-facing-forward hand pose, shown as pose 501 in FIG. 5, is illustrated and described herein as an exemplary controlling hand pose, other hand poses, or changes or transitions between hand poses, may also be recognized in a similar manner as engagement poses or gestures. Other hand poses that may be used to denote control or engagement include, for example, fingers-upright, palms-facing-forward hand pose 502; thumbs-up, fingers curled hand pose 504; and fingers-extended-forward, thumbs-up hand pose 505.

A representation of the user may be displayed in a central region of a control that further includes interaction elements disposed radially in relation to the central region, such as when the engagement gesture is performed and recognized. The representation of the user may be displayed to a novice user to prompt the user to interact with the interface, but may not be displayed for expert users who are familiar with performing the gestures. The interface may be configured by a user to display or not display a representation of the user, such as by displaying a representation of the user in a tutorial mode, and not displaying the representation in a normal mode or an advanced mode. The interface may display a representation if a user performs an engagement gesture but does not perform a gesture to select an item within a time limit.

The shape and configuration of the control may vary depending on a particular context, for example to be circular, square shaped, symmetrical or asymmetrical, linear, polygonal, odd-shaped, or to take on the shape of a circular sector, where the one or more interaction elements are disposed adjacent to the central region. In the case where control is circular and the interaction elements are radially oriented, the control may be referred to as a "gesture wheel."

An example gesture wheel includes eight points of the compass associated with eight different functions, characters, or clusters of characters, represented as icons. The wheel may be centered on a target location, such as a location at the center of a user interface or in an otherwise blank area of the user interface, such that the user can simply move the control object of their body in the general direction of the function they intend to invoke, in order to invoke that function by their directional motion. Another example gesture wheel includes fewer or more than eight interaction elements, or includes a variable number of interaction elements. For instance, the gesture wheel may include a single interaction element, ten interaction elements, or dozens, hundreds, or thousands of interaction elements.

A blank region determination function may iteratively locate a blank region of the screen, dynamically select a control shape and size, and present the dynamically selected control within the iteratively located blank region. For instance, the control may repeatedly adjust itself to avoid overlapping a moving image in the user interface, such as a simulated bouncing ball.

Figure 6:
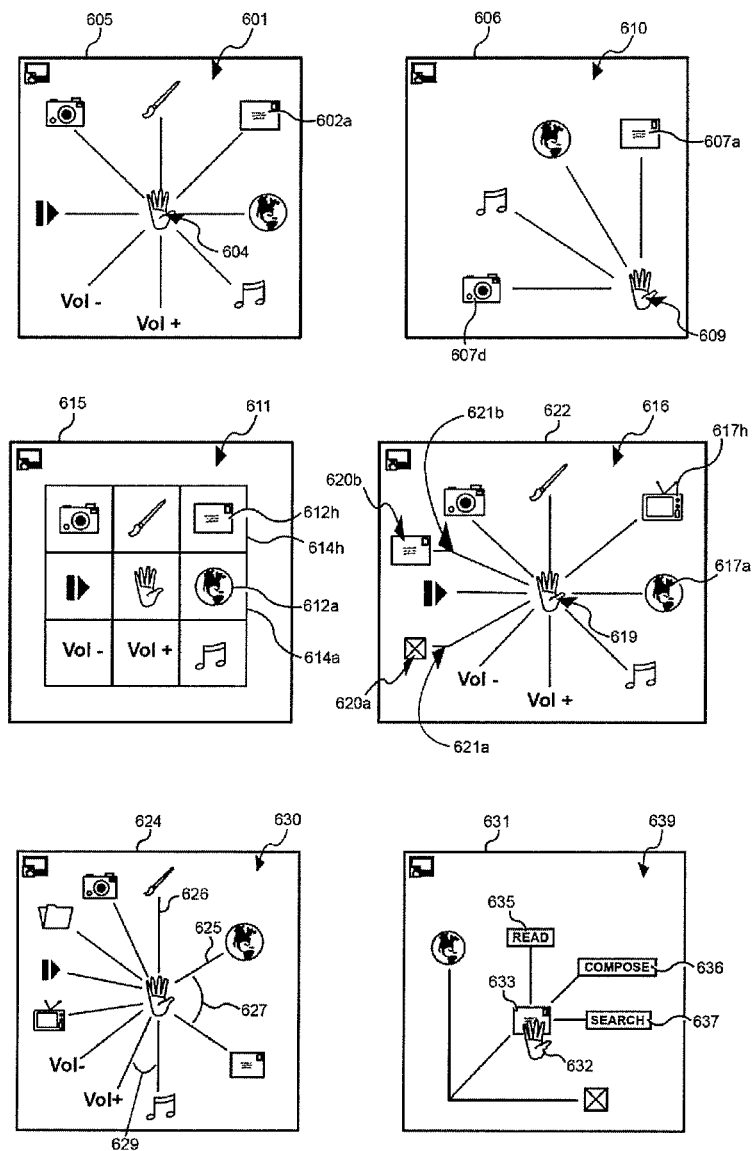
FIGS. 6, 16, and 19 to 24 illustrate several example control shapes and configurations.

FIG. 6 illustrates several example shapes and configurations of the enhanced control. Control 601 is a circular control including eight icons 602a to 602h emanating, hub-and-spoke fashion, from a central region 604. The central region 604 is generally aligned with the center of the user interface 605. Control 606 is a circular sector-shaped control, occupying a 90° sector, including four icons 607a to 607d also emanating, hub-and-spoke fashion, from a central region 609 located adjacent to the lower right corner of the user interface 610.

Control 611 is a square-shaped control including eight icons 612a to 612h located in block-shaped interaction regions 614a to 614h around a center region that is generally aligned with the center of the user interface 615. Control 616 is a generally circular-shaped and includes eight icons 617a to 617h emanating, hub-and-spoke fashion, from a central region 619, as well as two icons 620a and 620b that emanate from center region 619 along complex paths 621a and 621b on user interface 622.

Paths 621 are "complex" as they are not solely linear and may require that a user gesticulate in more than one direction in order to activate an icon. For instance, activation of the icon 620b may occur when the user gestures upward and to the left for a certain distance, then gestures left without an upward motion. Also notably, icon 620a is associated with a DISABLE CONTROL icon and function that, when invoked, effects to disable or turn off the control 616.

An interaction element includes any portion of the control that is associated with one or more functions, characters, or applications. For instance, each interaction element may include an icon that, when selected, invokes a function (e.g., a character input function) or an application. If the control includes more than one interaction element, the applications that may be selected by way of the control are each referred to as "candidate" application.

In one configuration where the control is circular, an interaction element can be spoke-like, appearing as a line emanating from the center of the control and terminated by an icon that invokes a function (e.g., a character input function) or application. In this case, small gestures, such as those caused by body jitter, may be ignored or may be ineffective at invoking an application associated with the interaction element, unless the magnitude of the small gesture is sufficient to cause the representation to travel the entire length of the spoke to reach the icon disposed at the far end of the spoke.

In another application where the control is pie-shaped, the interaction element may define a circular sector (pie-shaped) region, such that any motion (or motion that exceeds a threshold) of the representation into the interaction element will cause the interaction element to invoke a function (e.g., a character input function) or application. The threshold may be effected by defining a visible or invisible guide-line separating the central region from the interaction elements (or an outer portion of the interaction elements), where a guideline is selected based on proximity to the representation as the representation crosses the guideline. Such a configuration may allow for quicker selection of an interaction region, and may require less precision of motion by the user, or computational expense by the application to recognize fine motion.

The threshold may be a function of distance and/or speed. Specifically, a threshold multiplier may adapt to a user's style over a period of time, based upon the distance and speed that the user has performed previous gestures recorded over a period of time. Alternatively, the threshold-multiplier may adapt to a user's style while the gesture is being performed, based on the speed observed during the gesture. The threshold distance may be extended if the user moves more quickly (for users whose style is to flail their arms wildly), or shortened if the user moves more slowly (for users whose style is more deliberate). The threshold distance may be set according to the average distance is user has moved while performing previous gestures.

The radius and angle of the spokes may vary according to the likelihood that an item will be selected, so that it is easier to select a likely item or interaction element. Specifically, and as shown in user interface 624, the radius of the spoke 625 of a likely or popular item may be shorter than the spoke 626 associated with a normal item. Furthermore, there may be greater angle 627 between the likely items than an angle 629 between less popular items, thereby making it easier to select the likely item. The likelihood associated with of an item on the control 630, and thereby the property of its spoke, may depend on the popularity of the item, dynamically based on how many times the user has recently accessed the item, dynamically based on statistics about how many times a larger sampling of users have accessed the item, predetermined based on an expectation of use of the item, or predetermined based on which items a vendor wants to promote.

In addition to basing the spacing and angle of a control based on popularity, these and other qualities of a control may depend on a user's gesture or a part of a gesture. For example, if the user makes a waving gesture to the right, the items on the right may spread out so that they are easier to select, as shown in user interface 624. The user may then adjust the path of their gesture to follow a dynamically aligned interaction element, therefore resulting in a curved gesture path.

A particular interaction element may reveal or 'spawn' other interaction elements (or 'supplemental interaction elements'), revealing or defining complex paths. For instance, a parent interaction element may represent a category of functions or cluster of characters, and when parent interaction element is selected, child interaction elements representing the each of the category of functions or each character in the cluster may be revealed to radiate from the parent first interaction element. For instance, in user interface 631, when the representation 632 hovers over the mail icon 633 (i.e. the parent interaction element), a read mail icon 635, a compose mail icon 636, and a search mail icon 637 (the child interaction elements) spawn, or radiate from the selected mail icon 633.

In an initial state prior to selecting the mail icon 633, the control 639 may be centered within the user interface 631, where the control 639 may be moved to a corner to allow for easier selection of the child interaction elements when one of the mail icon 633 is selected. Alternatively, the control 639 may, in the initial state, already be disposed in the corner of the user interface 631.

In this regard, a complex path may be defined to include a motion in a direction of a parent interaction element followed by a motion in a direction of a child interaction element item. When the child items are revealed, siblings of the parent may vanish from the screen, allowing the selection of more items than whose icons would normally fit on the screen. For example, in a state prior to selecting the mail icon 633, the control 639 may include many more interaction elements and may, for example, have the visual appearance similar to the control 601.

In one implementation, the engagement gesture may result in the control object (i.e. hand) of the user's body being disposed in an awkward position. For instance, as a result of a "swiping" engagement gesture, the user's hand may lie near the boundary of or outside of a camera's field of view. In these and other circumstances, a process may occur to orient or align the user's control object with a target position (in free space) that eases or improves future gesture recognitions. The target position in free space may be predefined, such as a center position of the camera's field of view, or the target position may be dynamically determined, for instance in a well-lit position, or an area of high contrast or without a complex background, or in a region of the field of view away from other moving objects.

One approach for aligning the user's position for improved gesture recognition is to display the representation and a target image on the user interface or on the control, to infer to or guide the user to move the representation through motion of their body, so that the representation aligns with the target image. Thus, the representation of the user may initially be displayed outside the central region, and a target image may be displayed in the central region.

In other images, a realignment gesture may be recognized, the representation may be moved in relation to the target image based on the realignment gesture. If the moved representation aligns with the target image, the representation will be displayed in the central region. Realignment may assure the user's hand remains in the camera's field of view, or may also assure the user has enough reach of the arm to perform the gestures in one or more directions.

Although FIG. 6 illustrates several exemplary controls which associate functions or icons with interaction elements, these same controls may be used for the input of characters. For example, an interaction element may be associated with a character or cluster of characters, such that selection of the interaction causes the control to output a selected character, or to display child interaction elements for each character in the selected cluster of characters.

Figure 7:
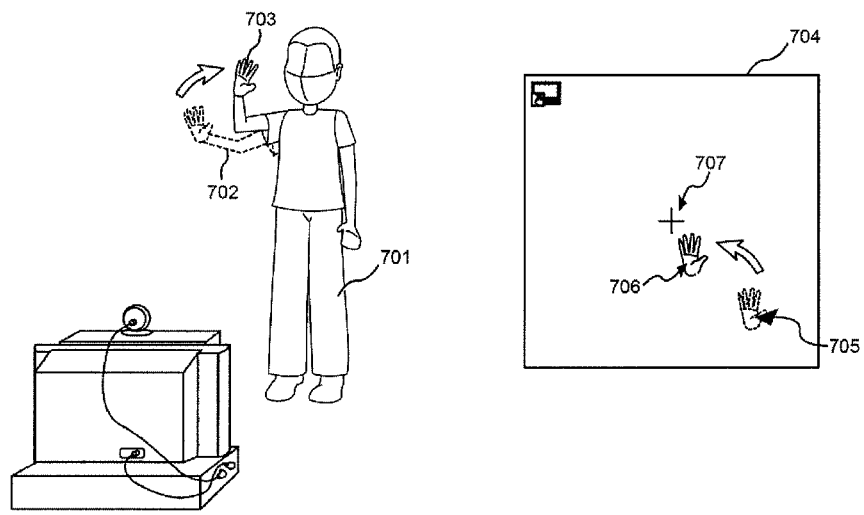

FIG. 7 illustrates an exemplary realignment gesture, in which a user 701 gesticulates his arm upward and left from a first position 702 to a second position 703, thereby causing the representation in the user interface 704 to also move from a first position 705 to a second position 706. As the second position 706 aligns with the target image 707 at the center of the user interface 707, the gesticulation will cause the enhanced control to appear initially. As the user subsequently gesticulates to interact with the enhanced control further realignments processes may be carried out to re-orient the control object to a desired position with the field of view.

In another configuration, a mouse cursor may be displayed at a position of the user interface corresponding to a position of the control object in free space. Alternatively, the control itself may be moved away from, or initially generated at a position other than the center of the user interface. For instance, if, as a result of the engagement gesture, the user's hand is located at the far left and far upper position of a camera's field of view, the control may be generated as a 90° circular sector radiating from the top right and far upper position on the user interface. In such a case, the same number of or fewer interaction elements may be displayed, as compared to the situation where the control would have been centered on the user interface and completely surrounded by interaction elements.

In any case, once the representation has been displayed within the center region of the control, the interface is enabled for gesture control. Based on the recognized user's gesture, an interaction with the control occurs. The recognized users gesture may cause the representation to move away from the center region of the control in a direction and magnitude based on the direction and magnitude of the user's motion in free-space, causing the representation to overlap one or more interaction elements.

The magnitude may also be a function of distance and speed. A magnitude-multiplier may adapt to a user's style over a period of time, based upon the distance and speed that the user has performed previous gestures recorded over a period of time. Alternatively, the magnitude-multiplier may adapt to a user's style while the gesture is being performed, based on the speed observed during the gesture. The magnitude-multiplier may be decreased if the user moves more quickly (for users whose style is to flail their arms wildly), or increased if the user moves more slowly (for users whose style is more deliberate).

Similar to a mouse event, when the representation overlaps or selects a particular interaction element, the control may become disabled, the underlying interaction element or icon may become highlighted, one or more of the applications or functions associated with the underlying interaction element may be invoked, executed, loaded, pre-loaded or otherwise run, an alternate mode (such as a "mouse control mode") may be activated, or nothing may occur at all other than to display the representation overlapping a portion of the control.

Figure 8:
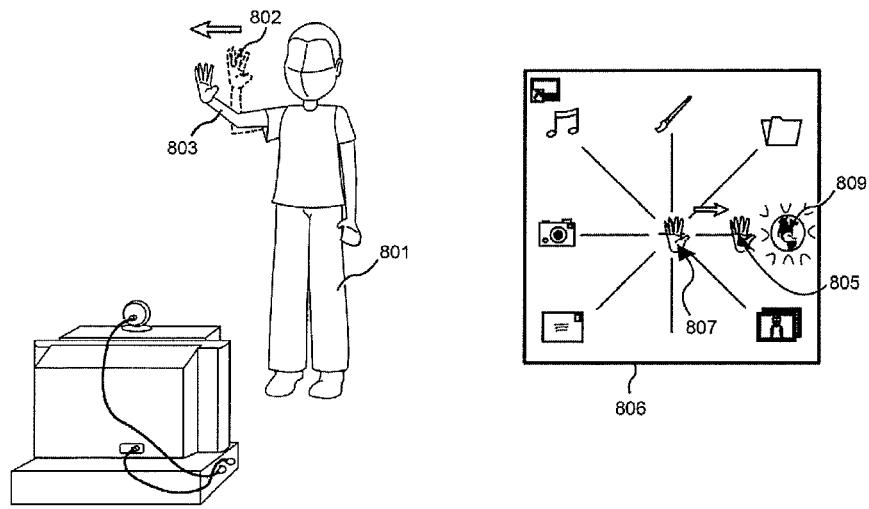

FIG. 8 illustrates an exemplary gesture and concomitant control interaction. Specifically, a user 801 gesticulates his arm from a first position 802 to a second position 803, thereby causing representation 805 in user interface 806 to move right from the center position 807 and to highlight icon 809 of an interaction element disposed to the right of the center region. The selection and highlighting of the icon 809 may mimic a mouse-over or mouse-down event or a keystroke, causing the execution of an application associated with the icon 809 (such as a web browser application). Irrelevant motions of the user 801, such as the slightly downward motion of the arm in the second state 803, may be filtered or ignored, such as after referencing an anatomical model.

Figure 9:
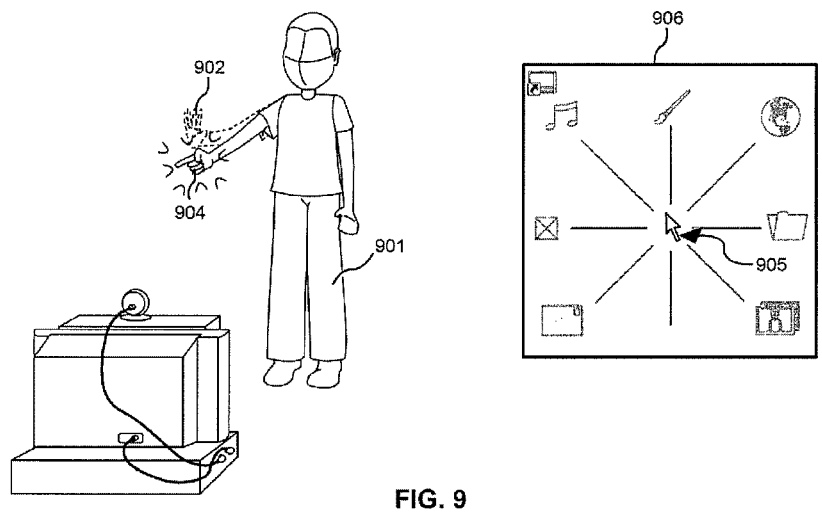

In the mouse control mode, further gestures such as finger motions are mapped to mouse events. For instance, and as shown in FIG. 9, if the user 901 determines that they would rather move to desktop control of a mouse cursor, then instead of sweeping their hand toward an interaction element, they could instead collapse a five fingered hand pose 902 into a pointing finger hand pose 904 to invoke the mouse control mode. Mouse control mode may be visualized by substituting a different representation, such as where arrow cursor 905 is substituted for another non-mouse-control-mode representation in the user interface 906.

Figure 10:
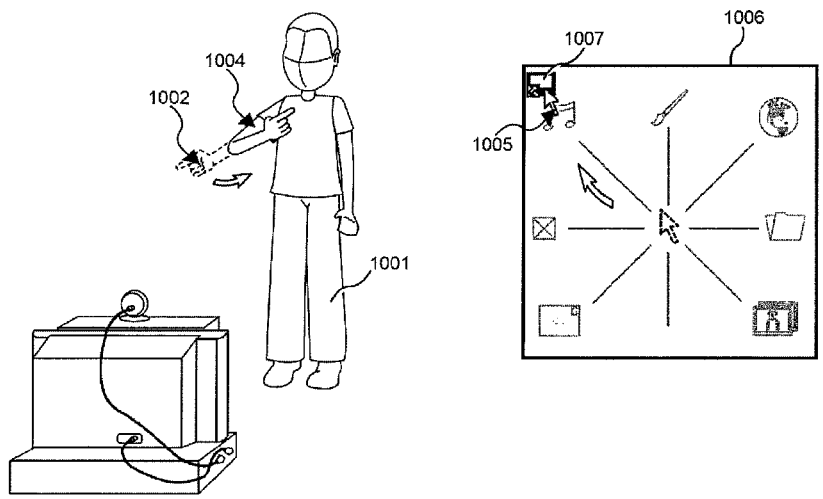

In the mouse control mode, a tracking system signals the control to disappear from the screen or to become disabled (such as by completely disappearing, by becoming more transparent, or by being grayed out), and the mouse cursor appears at the tracked mouse location based on the hand and/or finger position of the user as the user moves their hand around the display. As shown in FIG. 10, once the mouse control mode is activated, the user 1001 may move his arm and pointed hand up and to the left, from a first position 1002 to a second position 1004, causing representation 1005 in the user interface 1006 to move toward the desktop icon 1007.

Figure 11:
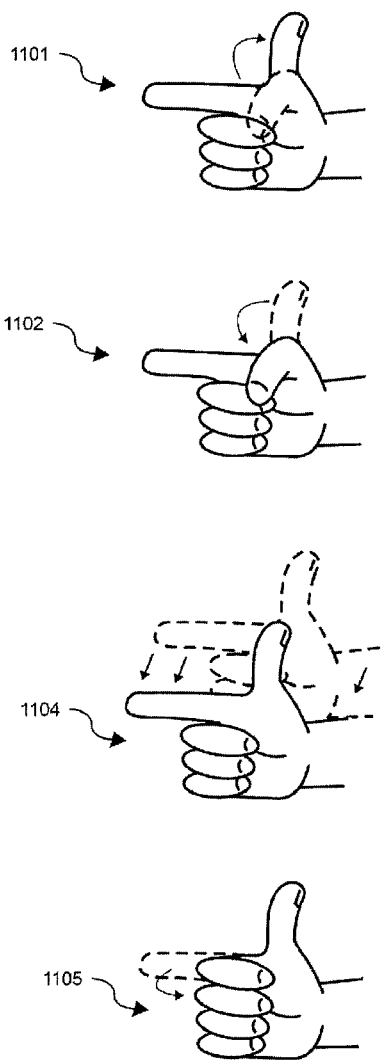

Other hand poses and gestures may also be used to emulate mouse or keyboard events. For instance, and as shown in FIG. 11, a pointed-forefinger, thumb-up gesture 1101 may emulate a mouse-down event, a pointed-forefinger, thumb-down gesture 1102 may emulate a mouse-up event, a hand-chopping gesture 1104 may emulate a cancel or escape event or a double-click event, and a thumb-up, curled finger gesture 1105 may emulate a single-mouse-click event. Even in the mouse control mode, certain gestures may be mapped to character inputs.

In additional examples, to effect a mouse-down event, the user may raise their thumb above their pointing finger in the classic "gun" pose. To effect a mouse-up event, the user may lower their thumb back to its resting position. To effect a right-click event, the user may hold the "mouse down" pose for a preset time without moving their hand and invoke the right click menu. The mouse cursor position may be filtered to prevent the position of the mouse cursor from inadvertently moving while the user gesticulates a mouse-down or mouse-up gesture. For example, the cursor position may be momentarily returned to the position at the start of the detected gesture while the mouse-up or mouse-down event is executed.

In another exemplary gesture set, the thumb-down gesture 1102 may emulate a mouse-down event and a thumb-up gesture 1101 may emulate a mouse-up event. Bending the finger down may emulate a mouse-down event, and straightening the finger may emulate a mouse-up event. A right-click may be emulated using a similar gesture involving a different fingers, or multiple fingers. Clenching the hand in a "grabbing" motion, where closing the hand may emulate a mouse-down event and opening the hand may emulate a mouse-up event. This exemplary gesture set may be intuitive because dragging is performed by grabbing and pulling, and may have sufficient accuracy despite the fact that there is no finger pointing, and that the hand size changes.

Furthermore, although the palm-forward, fingers-extended hand poses has been described above as an example engagement gesture and finger-pointed, thumb-up hand pose has been described as a mouse-down gesture, other configurations are possible. For instance, the palm-forward, fingers extended hand pose may be used to generate a mouse-down event, by closing the hand in a grabbing motion to signify a mouse-down event, and by opening the hand to signify a mouse-up event. In this regard, specific hand gestures used may be adjusted so that signified commands feel natural to a user.

Figure 12:
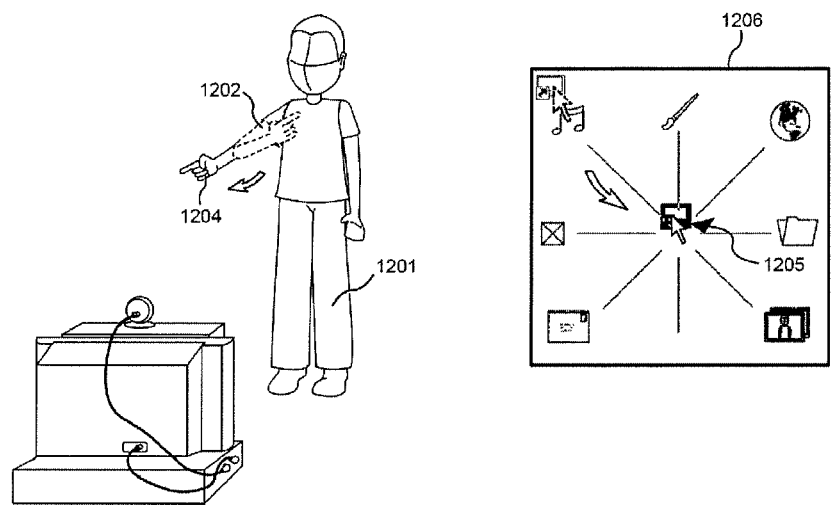

As illustrated in FIG. 12, to effect a mouse-drag event, the user may keep their hand in the "mouse down" pose while moving their hand around the tracking region to move the mouse accordingly. Specifically, a user 1201 moves his arm down and to the left from a first position 1202 to a second position 1204 while holding the mouse-down, finger-pointed pose, to grab the desktop icon 1205 and move it toward the center of the user interface 1206. To perform "multi-touch" control actions, the user may introduce a second hand to the tracking region, and use the thumb moves to perform "clicks" with this extra available tracking element.

An application, such as a media center application, may be controlled based on interacting with the control. Controlling the application may further include using a character input function to enter text into an application or controlling a candidate application associated with a highlighted or selected icon, or associated with an interaction element adjacent to a moved or re-aligned representation.

Figure 13:
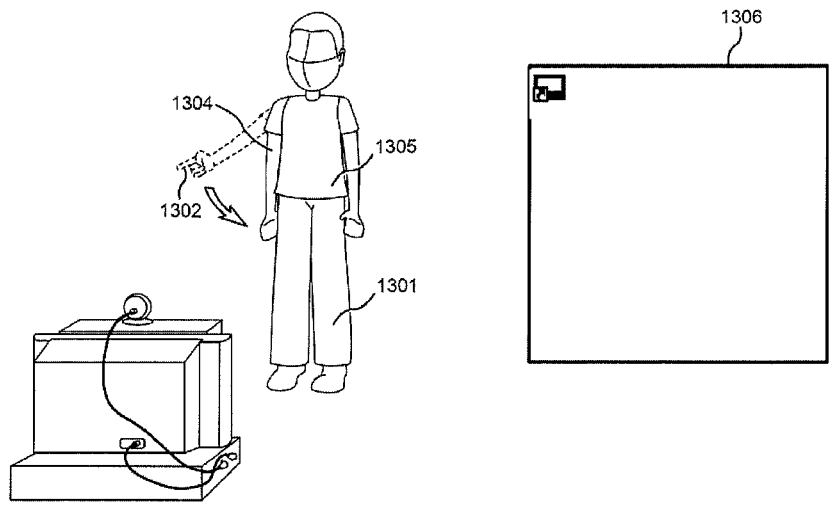

It may be that the user intends to disable, disengage or deactivate the enhanced control. One approach is to use a hand pose or hand pose plus hand motion to turn off gesture control until the engagement gesture is to be reactivated. In FIG. 13, for example, the user 1301 drops his arms from a controlling, first position 1302 to a collapsed or relaxed position adjacent to his torso 1305. Such a motion causes the control to disappear from the user interface 1306.

Figure 14:
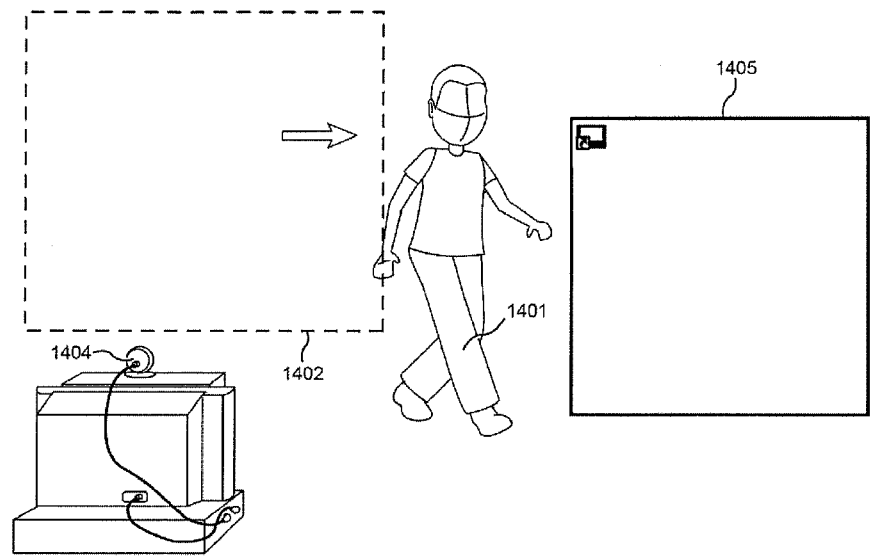

Another approach is to detect the physical presence of the torso of the user, and to disable the control when both the hand and the body move out of tracking range or are no longer between the camera and a plane define a certain distance away from the camera. As illustrated in FIG. 14, for instance, the user 1401 disables the control by moving outside of the frame-of-view 1402 of the camera 1404, causing the control to disappear from the user interface 1405.

Figure 15:
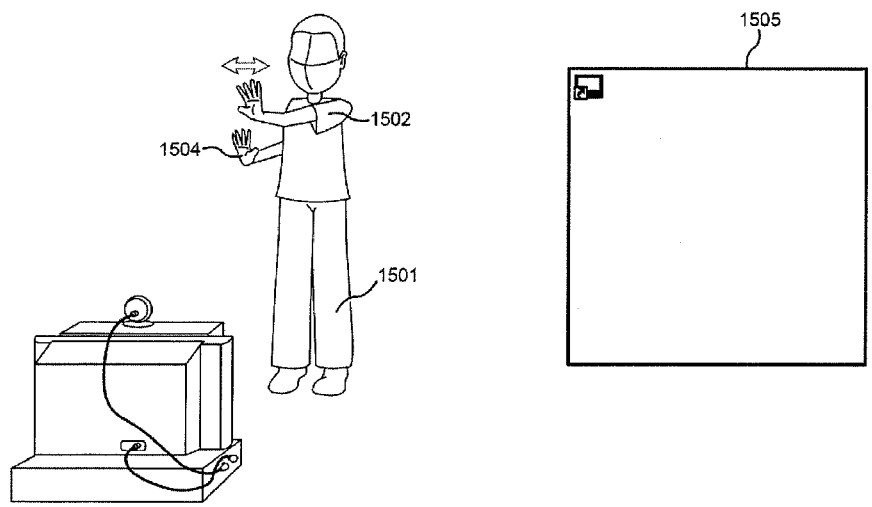

In the case where one interaction region is associated with a DISABLE CONTROL function, the user may also explicitly disable the control by sweeping their hand in the direction of that disabling interaction region. Furthermore, and as shown in FIG. 15, the user 1501 may disable the control using action of another control object, such as by gesticulating a second hand 1502 in a sweeping motion over the first hand 1504, thereby clearing the user interface 1505.

Figure 16:
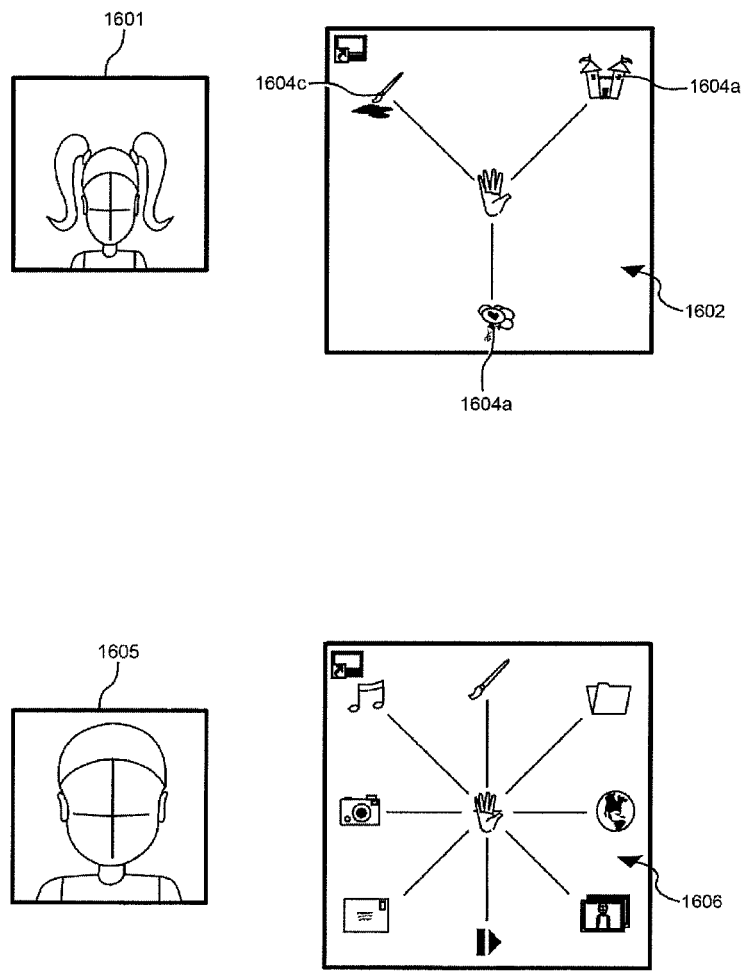

The control may be dynamically modified based on the identify or position of the user, based on other applications running on the device, on the amount of free space within the user interface, or for other reasons. For instance, and as shown in FIG. 16, if the user is identified as a child user 1601, the control 1602 may take on a simpler shape, and may have icons 1604 that are appropriate (such as age- or maturity-appropriate) to the child user 1601. Similarly, if the user is identified as an adult user 1605, the control 1606 may take on a more complex shape, and may have fewer restrictions or otherwise allow additional access to icons or functionality that is appropriate to the adult user 1605.

Figure 17:
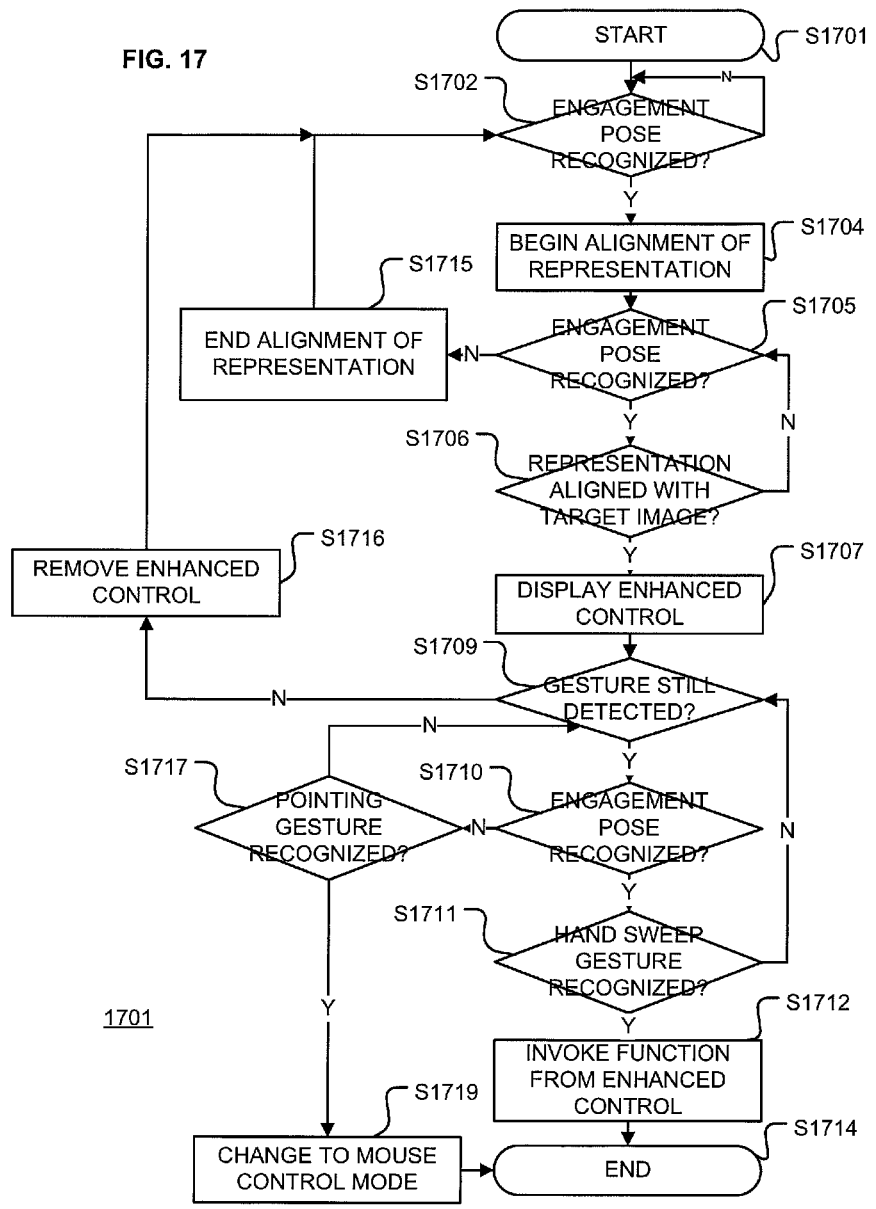
FIGS. 17 and 18 are flowcharts of exemplary processes.

FIG. 17 is a flowchart of an exemplary process 1701 that effects enhanced input using recognized gestures. When the process 1701 begins (S1701), it is determined whether an engagement pose is detected from an image or images of a user (S1702). If it is determined that the engagement pose is not recognized (at S1702), the process 1700 waits until the engagement pose is recognized (S1702).

If an engagement pose is detected (at S1702), the a representation alignment process begins (S1704), and it is again determined whether the engagement pose is still detected (S1705). If it is determined that the engagement pose is still detected (at S1705), it is determined whether the representation is aligned with the target image (S1706).

If it is determined that the representation is aligned with the target image (at S1706), the enhanced control is displayed (S1707), and it is determined whether the gesture is still detected (S1709). If the gesture is still detected (at S1709), it is determined whether the engagement pose is still present (S1710). If the engagement pose is still present (at S1710), it is determined whether a hand sweep gesture is recognized (S1711). If a hand sweep gesture is recognized (at S1711), the function associated with the hand sweep is invoked using the enhanced control (S1712), thereby ending the process 1700 (S1714). The function associated with the hand sweep may be a character or word selection or input function.

If it is determined that the engagement pose is not recognized (at S1705), the alignment process for the representation ends (S1715), and the process 1700 waits until the engagement pose is recognized (S1702). If the representation is not aligned with the target image (S1706), it is determined whether the engagement pose is recognized (S1705). If the gesture is not still detected (S1709), the enhanced control is removed (S1716), and the process 1700 waits until the engagement pose is again recognized (S1702).

If the engagement pose is not recognized (S1710), it is determined whether a pointing gesture is recognized (S1710) and, if so, mouse control mode is activated (S1719) and the process 1700 ends (S1715). If the pointing gesture is not recognized (S1717), it is determined whether a gesture is still detected (S1709). If a hand-sweep gesture is not recognized (at S1711), it is determined whether the gesture is still detected (S1709).

In this regard, a user is enabled to interact with an enhanced on-screen control to thereby invoke media center functionality, by performing certain gestures that, based on accessing images of the user, are capable of automatic recognition. Among other features, the control includes icons that initially surround a representation of the user, effecting easy selection of underlying icon functionality through straightforward, intuitive, and natural motions of the user's body.

Figure 18:
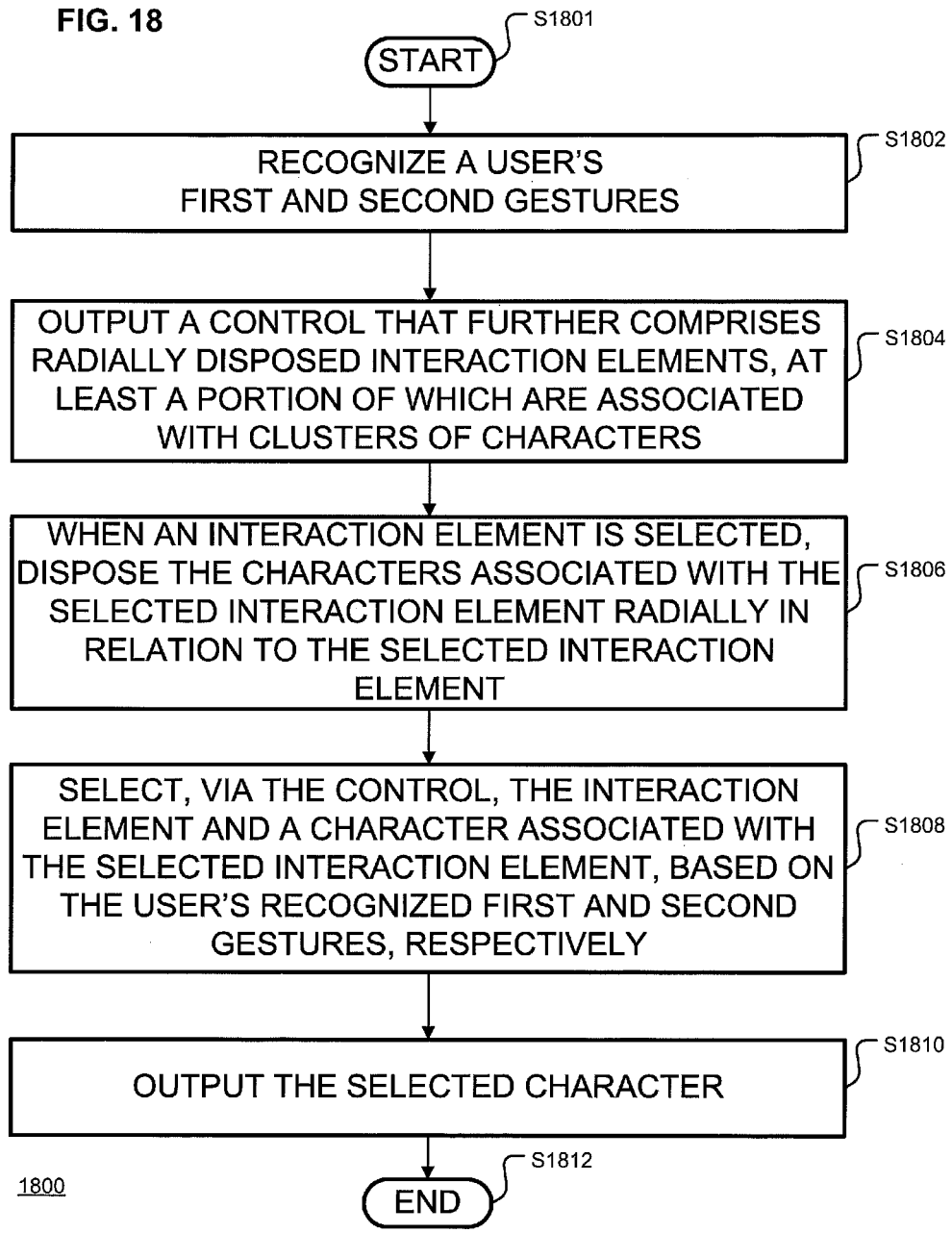

FIG. 18 is a flowchart illustrating a computer-implemented process 1800 that effects enhanced character input using recognized gestures. When the process 1800 begins (S1801), a user's first and second gestures are recognized (S1802). A control is outputted that further comprises radially disposed interaction elements, at least a portion of which are associated with clusters of characters (S1804). When an interaction element is selected, the selected interaction element's associated characters are disposed radially in relation to the selected interaction element (S1806). The interaction element and a character associated with the selected interaction element are selected, using the control, based on the user's recognized first and second gestures, respectively (S1808). The selected character is outputted (S1810), ending the process 1800 (S1812).

Figure 19:
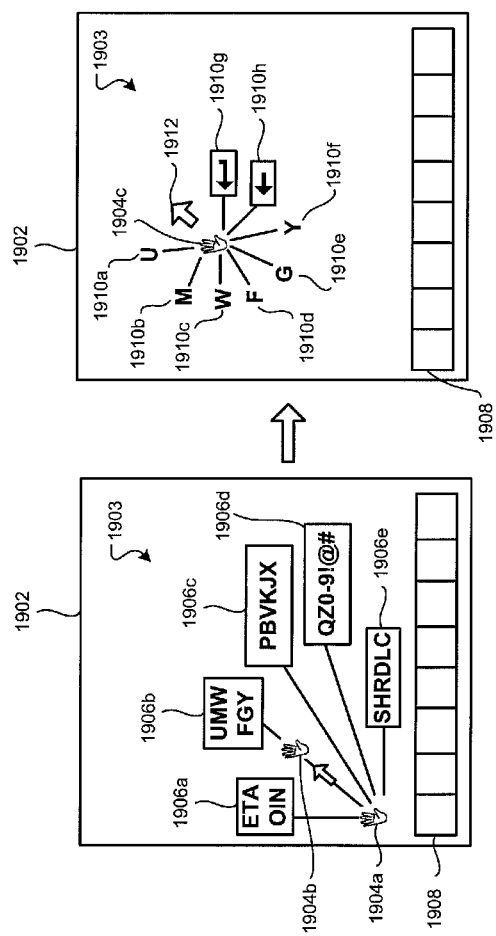

FIG. 19 illustrates a user interface 1902 for character input. The user interface 1902 includes an enhanced control 1903. The enhanced control 1903 includes a user representation 1904a, interaction elements 1906a to 1906e, and a display area 1908.

Various approaches may be used to group characters into clusters. For example, in addition to grouping characters by sequence ('A' to 'I', 'J' to 'R', etc.), characters can be grouped into clusters based on popularity of individual characters. Interaction elements associated with more popular characters can be located closer to the representation 1904a than interaction elements associated with less popular characters, resulting in a generally shorter gesture movement for selection of popular characters. For example, interaction element 1906a, which is associated with the popular characters 'E', 'T', 'A', 'O', 'I', and 'N', is positioned closer to the representation 1904a than the interaction element 1906c, which is associated with the less popular characters 'P', 'B', 'V', 'K', 'J', and 'X'.

Various approaches may be used to determine character popularity. For example, character popularity may be dynamically determined based on a user's past entries, and/or character popularity may be pre-determined based on statistics indicating frequencies of occurrence of characters in a particular language.

Considering interface 1902, the user may gesture upward-and-rightward to affect the movement of the representation 1904a towards the interaction element 1906b (as illustrated by a user representation 1904b). If the representation 1904b interacts with the interaction element 1906b, the interaction element 1906b is hidden or otherwise disabled and is replaced with supplemental interaction elements 1910. The supplemental interaction elements 1910a to 1910f represent the characters associated with the interaction element 1906b. The supplemental interaction element 1910g represents an accept-entry function.

The supplemental interaction element 1910h represents a backspace function which allows the user to cancel the selection of a character associated with the interaction element 1906b. For instance, selection of the supplemental interaction element 1910h may delete or cancel the most recently entered character. Since a user may inadvertently select an interaction element associated with an "incorrect" cluster of characters, invocation of the interaction element 1910h may function to disable or hide the inadvertently spawned characters 1910a to 1910h, and re-enable the disabled or hidden interaction elements 1906 and associated functionality. For instance, if the user intended to select the character "P" but initially selected the interaction element 1906b, invocation of the backspace function (by selecting interaction element 1910h) may return the user interface 1902 to a state where interaction element 1906c may again be selected, such as the state shown on the left side of FIG. 19. In a further implementation, functionality for deleting a most recently entered character and functionality for disabling an inadvertently spawned character may be assigned to or otherwise associated with separate interaction elements.

The supplemental interaction elements 1910 may be disposed radially from a user representation 1904c, such that a "gap" (i.e., an absence of an interaction element, where an interaction element might otherwise be located) exists in a location corresponding to the direction of the user's movement. A gap, or absence of an interaction element may prevent the unintended selection of an interaction element located in the direction of the user's motion. For example, the rightward and upward motion used to select interaction element 1906b may continue in the same direction farther than the user intended, as indicated by arrow 1912.

Figure 20:
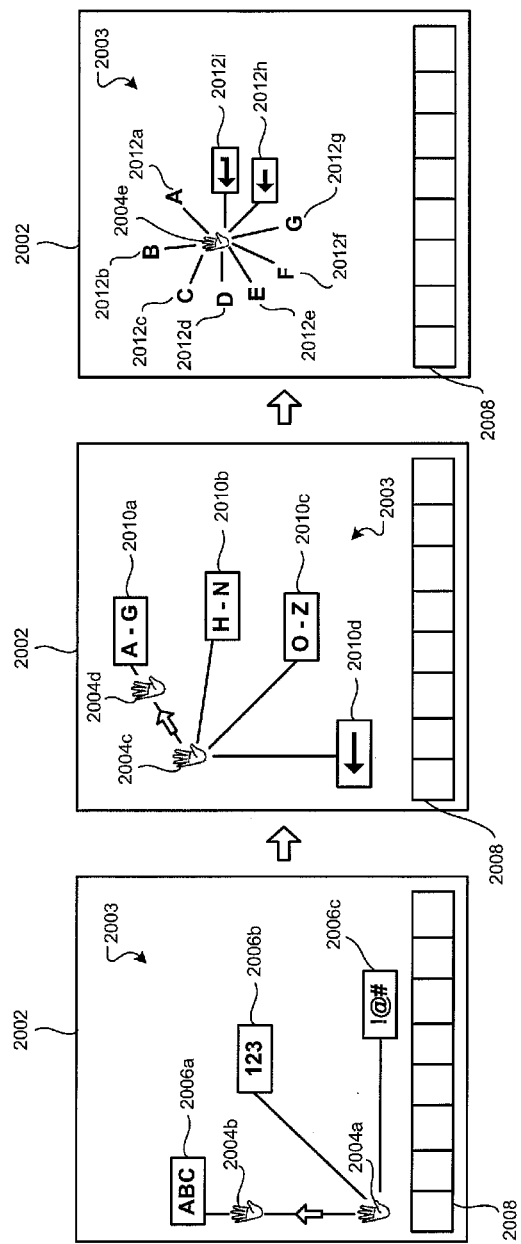

FIG. 20 illustrates a user interface 2002 for character input. The user interface 2002 includes an enhanced control 2003. The enhanced control 2003 includes a user representation 2004a, interaction elements 2006a to 2006c, and a display area 2008.

The interaction element 2006a represents alphabetical characters, the interaction element 2006b represents numeric characters, and the interaction element 2006c represents symbolic characters.

If the user gestures in an upward direction to cause the representation 2004a to move upward, as illustrated by a user representation 2004b, so that the representation 2004b overlaps or becomes adjacent to the interaction element 2006a, an interaction with the interaction element 2006a occurs. In response to the interaction with the interaction element 2006a, the control 2003 changes so that the interaction elements 2006a-c are hidden and interaction elements 2010a-d are shown. The interaction element 2010a represents the characters 'A' to 'G', the interaction element 2010b represents the characters 'H' to 'N', and the interaction element 2010c represents the characters 'O' to 'Z'. The interaction element 2010d represents a backspace function which allows the user to "cancel" the selection of an alphabetic character.

The user may gesture in a direction which causes a user representation 2004c to move towards the interaction element 2010a, as illustrated by a user representation 2004d. If the representation 2004d overlaps or becomes adjacent to the interaction element 2010a an interaction with the interaction element 2010a occurs, and the control 2003 changes so that the interaction elements 2010 are hidden and the interaction elements 2012 are shown. Interaction elements 2012a-g represent the characters 'A', 'B', 'C', 'D', 'E', 'F', and 'G', respectively. The interaction element 2012h represents a backspace function which allows the user to cancel the character selection. The interaction element 2012i represents an enter function which allows the user to finalize a word entry. The user may select a character by gesturing in a direction causing the representation 2004 to move towards and overlap or become adjacent to an interaction element 2012a-g.

Figure 21:
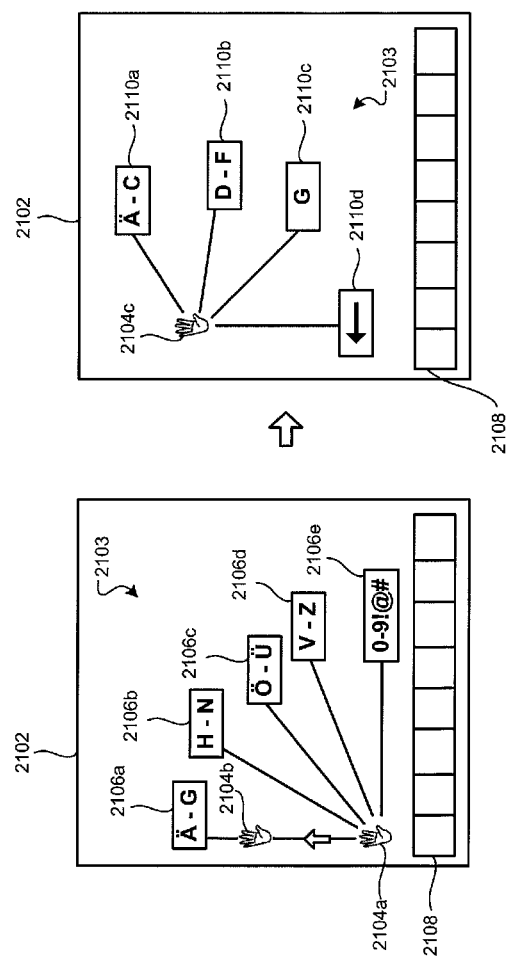

FIG. 21 illustrates a user interface 2102 for character input. The user interface 2102 includes an enhanced control 2103. The enhanced control 2103 includes a user representation 2104a, interaction elements 2106a to 2106e, and a display area 2108.

The enhanced control 2103 may be used to select characters from various languages. For example, the interaction element 2106a represents the German alphabetical characters 'Ä' through 'G', the interaction element 2106b represents the German alphabetic characters 'H' through 'N', the interaction element 2106c represents the German alphabetic characters Ö through Ü, and the interaction element 2106d represents the German alphabetic characters 'V' through 'Z'. The interaction element 2106e represents numeric and symbolic characters. More than one control may be displayed on the user interface 2102, for example where each control accepts input from one of two hands of a user, or of multiple users.

If the user gestures in an upward direction, to cause the representation 2104a to move upward as illustrated by a user representation 2104b, so that the representation 2104b overlaps or becomes adjacent to the interaction element 2106a, an interaction with the interaction element 2106a occurs. In response to the interaction with the interaction element 2106a, the enhanced control 2103 changes so that the interaction elements 2106a-e are hidden and interaction elements 2110a-d are shown. The interaction element 2110a represents the characters 'A' to 'C', the interaction element 2110b represents the characters 'D' to 'F', and the interaction element 2110c represents the 'G' character. The interaction element 2110d represents a backspace function which allows the user to "cancel" the selection of a character.

As shown in FIG. 21, interaction elements can represent a cluster of characters or a single character. A mixture of interaction elements representing single characters and interaction elements representing cluster of characters can be simultaneously displayed in the enhanced control 2103 (as shown in FIG. 21). The number of interaction elements displayed, the number of interaction elements representing single characters, and the number of interaction elements representing clusters of characters may be dynamically determined based on factors such as the amount of available display space.

Figure 22:
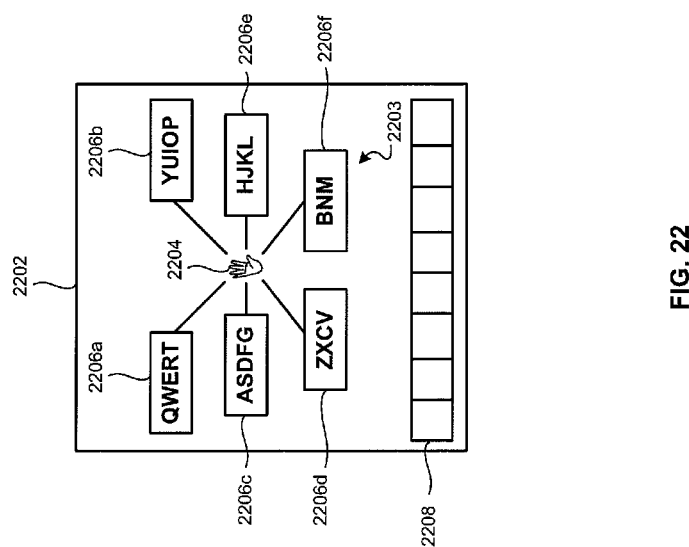

FIG. 22 illustrates a user interface 2202 for character input. The user interface 2202 includes an enhanced control 2203. The enhanced control 2203 includes a user representation 2204, interaction elements 2206a-f, and a display area 2208. The placement of character clusters in interaction elements 2206 in the enhanced control 2203 corresponds to the placement of characters on a standard "QWERTY" keyboard. For example, the characters 'Q', 'W', 'E', 'R', and 'T', which are located in the upper left section of a standard "QWERTY" keyboard, are associated with the upper left interaction element 2206a. Similarly, the relative position of other characters displayed in interaction elements in the enhanced control 2203 correspond to the relative position of those characters on a standard "QWERTY" keyboard.

Figure 23A:
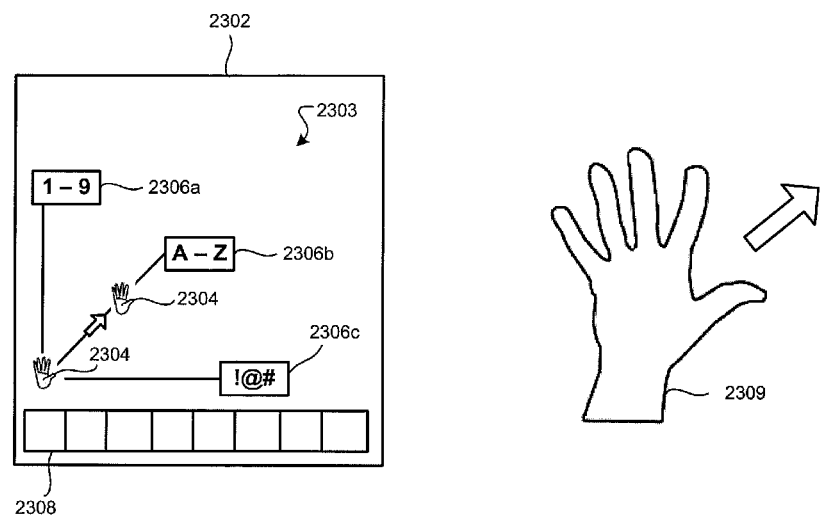

FIGS. 23A-D illustrate a user interface 2302 for character input. As shown in FIG. 23A, the user interface 2302 includes an enhanced control 2303. The enhanced control 2303 includes a user representation 2304, interaction elements 2306a to 2306c, and a display area 2308. The interaction element 2306b represents alphabetical characters, the interaction element 2306a represents numeric characters, and the interaction element 2306c represents symbolic characters.

Figure 23B:
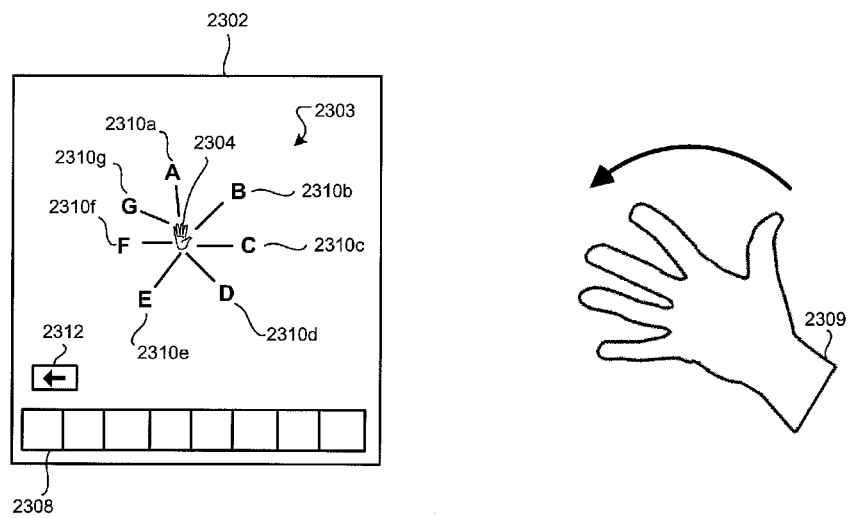

If, for example, the user gestures with a hand 2309 in an upward-and-rightward direction to cause the representation 2304 to move upward-and-rightward so that the representation 2304 overlaps or becomes adjacent to the interaction element 2306b, an interaction with the interaction element 2306b occurs. In response to the interaction with the interaction element 2306b, the control 2303 changes so that the interaction elements 2306a-c are hidden and interaction elements 2310a-g and 2312 are shown (as illustrated in FIG. 23B). The interaction elements 2310a to 2310g represent the characters 'A', 'B', 'C', 'D', 'E', 'F', and 'G', respectively. The interaction element 2312 represents a backspace function which allows the user to "cancel" the selection of an alphabetic character.

In some implementations, if the user rotates his hand 2309 (e.g., counterclockwise), the control 2303 "rotates" or "scrolls" the interaction elements 2310. For example, as shown in FIG. 23C, the interaction elements 2310d to 2310g have rotated counterclockwise, new interaction elements 2310h, 2310i, and 2310j appear in the control 2303, and the interaction elements 2310a, 2310b, and 2310c have been removed from the control 2303.

The user may rotate the control 2303 to cause a character (i.e., an interaction element representing a character) to appear that had been previously undisplayed. For example, the user may have rotated the control 2303 to cause the 2310j interaction element to appear (so that the user can select the 'J' character). If, for example, the user gestures with their hand 2309 in an upward and leftward direction to cause the representation 2304 to move upward and leftward so that the representation 2304 overlaps or becomes adjacent to the interaction element 2310j, an interaction with the interaction element 2310j occurs. In response to the interaction with the interaction element 2306j, a 'J' character is displayed in the display area 2308.

In a distance model, the control 2303 rotates in a distance and direction proportional to the rotation of the hand 2309. In a velocity model, the user rotates the hand and then holds the pose of the hand. The control 2303 continues to rotate as the user holds the rotation pose. In a velocity model, a reference angle may be defined (e.g., 90 degrees). The control 2303 may rotate at a velocity proportional to the difference between the angle of the user's rotated hand and the reference angle (i.e., the control 2303 may rotate faster as the user increases the angle of rotation).

The mapping of a relative angle to velocity may include a "dead zone," whereby the velocity may be zero if the relative angle is less than a dead zone distance, so that a user may stop the movement by returning the hand to near (but not necessarily exactly to) the reference angle. The mapping of a relative angle to velocity may be non-linear, such that a change in rotation angle near the reference angle may result in a change of velocity of small magnitude, while a change in rotation angle further from the reference angle may result in a change of velocity of larger magnitude. Non-linear mapping may allow a user fine control of low velocities, and coarser control of high velocities.

When using a velocity model, the velocity may return to zero if the user returns his hand position to within the dead zone; if the user changes the hand pose to palm forward and fingers and thumb spread; if the hand goes outside the field of view of a camera; if the user retracts his hand fully towards his body and drops his arm to his side; or if another event occurs. The velocity may return to zero by gradually diminishing over a short period of time.

Figure 24:
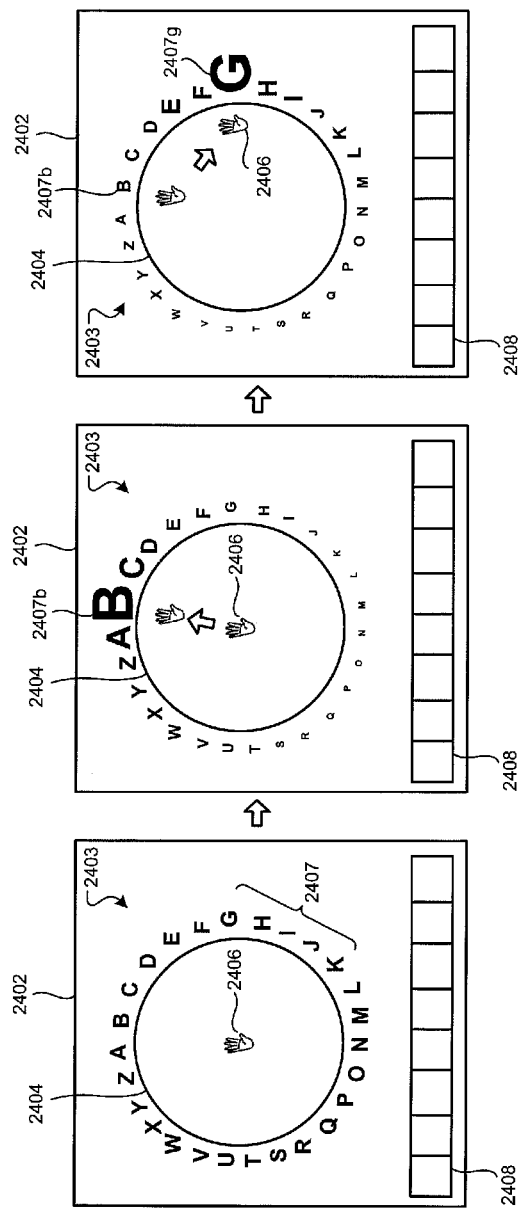

FIG. 24 illustrates a user interface 2402 for character input. As shown in FIG. 24, the user interface 2402 includes an enhanced control 2403. The enhanced control 2403 includes a guide line 2404, a user representation 2406, interaction elements 2407, and a display area 2408.

The user representation 2406 is displayed, such that the representation 2406 may conveniently and reliably touch selectable interaction elements aligned along the guide line 2404 dynamically positioned relative to the representation 2406. A touch may be determined where a part of the representation 2406 intersects with an interaction element's region along the guide line 2404. When a portion of the representation 2406 enters the touch region, interaction elements near that touch region may be zoomed-in or otherwise highlighted.

By orienting or aligning interaction elements 2407 along the guide line 2404, the interaction elements 2407 may be displayed so as to not overlap, block, or otherwise obscure a portion of an object also displayed within the user interface 2402, to allow for intuitive selection of the interaction elements by a user. Although the guide line 2404 is illustrated as a circle in FIG. 24, in other example implementations the guide line 2404 is depicted in another shape, as a dashed or solid line, as three-dimensional, or is not depicted at all.

As the user performs a movement gesture (e.g., moving their hand), the user representation 2406 moves in the user interface 2402 in a corresponding distance and direction. For example, the user may gesture upward and slightly to the right to effect the movement of the user representation 2406 towards an interaction element 2407b.

To facilitate user selection of interaction elements, interaction elements may be displayed in increasing size based on their distance to the user representation 2406. In other words, interaction elements located closer to the user representation 2406 (e.g., 2407b) may be displayed in a larger size than interaction elements located farther from the user representation 2406. For example, as the user representation 2406 moves towards the interaction element 2407b (i.e., near or crossing over the guide line 2404), the interaction element 2407b (and to a lesser extent, the interaction elements located near interaction element 2407b) are displayed in an increasing size. If the user representation 2406 moves away from the interaction element 2407b and towards a different interaction element (e.g., interaction element 2407g), the size of the interaction element 2407b decreases and the size of the other interaction element (e.g., interaction element 2407g) increases.

Put another way, in some implementations, the color, opacity and/or size of the interaction element closest to the user representation 2406 is changed to a first degree or extent, thereby making that interaction element appear the largest out of all of the interaction elements displayed along the guide line 2404, and the color, opacity and/or size of interaction elements which are adjacent to and equidistant from the interaction element closest to the user representation 2406 are changed to a second, lesser degree or extent. By also changing the color, opacity, size or other characteristic of adjacent interaction elements, the user can identify the position of a cursor or of a selected interaction element more easily, increasing the intuitive nature and ease of use of the control 2403. The color, opacity, size, or other characteristic of interaction elements may indicate a cursor position even where no visible cursor image (i.e., no user representation 2406) is explicitly rendered.

Since the control 2403 allows for the selection of a small number of interaction elements at a given point in time and most interaction elements thus remain unselected, the unselected interaction elements may be reduced in size to allow for a large number of interaction elements to be displayed within the user interface 2402. Increasing the size of certain interaction elements under consideration for selection, however, may increase the overall recognition or readability of the interaction elements under consideration for selection, thereby increasing reliability of the control. Put another way, in decreasing the size of unselected interaction elements, a larger number of selectable interaction elements can be presented to a user than could otherwise be discretely selected or touched.

Figure 25:
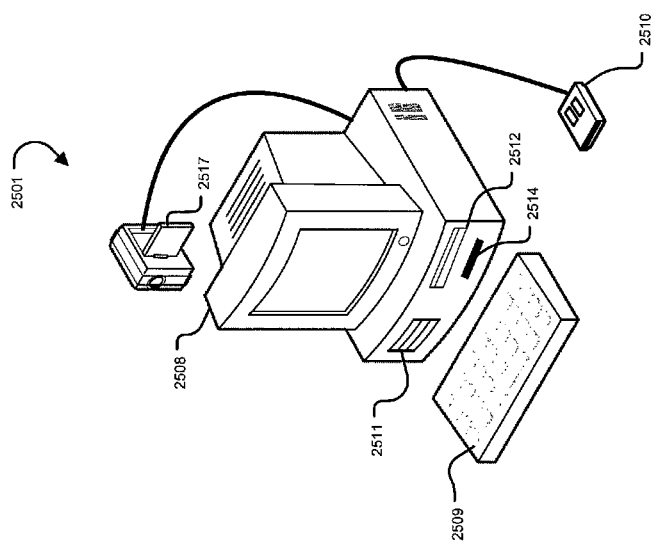
FIG. 25 illustrates an example of the exterior appearance of a computing device 1801 that further includes a processor and a user interface.

FIG. 25 illustrates an example of the exterior appearance of a computing device 2501 that further includes a processor and a user interface. In a further general implementation, a device includes a user interface and a processor. The user interface is configured to display a representation of a user in a central region of a control that further includes interaction elements disposed radially in relation to the central region. The processor is configured to recognize, from first and second images, a user's gesture, to interact with the control based on the recognized user's gesture, and to control an application based on interacting with the control.

In more detail, the hardware environment of the computing device 2501 includes a display monitor 2508 for displaying text and images to interface with a user, a keyboard 2509 for entering text data and user commands into the computing device 2501, a mouse 2510 for pointing, selecting and manipulating objects displayed on the display monitor 2508, a fixed disk drive 2511, a removable disk drive 2512, a tape drive 2514, a hardcopy output device, a computer network connection, and a digital input device 2517.

The display monitor 2508 displays the graphics, images, and text that make up the user interface for the software applications used by the computing device 2501, as well as the operating system programs necessary to operate the computing device 2501. A user uses the keyboard 2509 to enter commands and data to operate and control the computer operating system programs as well as the application programs. The mouse 2510 may be any type of pointing device, and may be a joystick, a trackball, a touch-pad, or other pointing device. Software used to display a user interface and enable a user to enter or select text, numbers, or select from a menu of options is stored locally on computer readable memory media, such as the fixed disk drive 2511.

In a further implementation, the fixed disk drive 2511 itself may include a number of physical drive units, such as a redundant array of independent disks ("RAID"), or may be a disk drive farm or a disk array that is physically located in a separate computing unit. Such computer readable memory media allow the computing device 2501 to access computer-executable process steps, application programs and the like, stored on removable and non-removable memory media.

The computer network connection may be a modem connection, a local-area network ("LAN") connection including the Ethernet, or a broadband wide-area network ("WAN") connection such as a digital subscriber line ("DSL"), cable high-speed internet connection, a broadband over power line connection, dial-up connection, T-1 line, T-3 line, fiber optic connection, or satellite connection. The network 1306 may be a LAN network, a corporate or government WAN network, the Internet, or other network.

The computer network connection may be a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE®-1394 FIREWIRE® connector, a Universal Serial Bus ("USB") connector, a serial port connector, a parallel port connector, or other wireline connector.

The removable disk drive 2512 is a removable storage device that is used to off-load data from the computing device 2501 or upload data onto the computing device 2501. The removable disk drive 2512 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 2511 or on removable media for the removable disk drive 2512.

The tape drive 2514 is a tape storage device that is used to off-load data from the computing device 2501 or to upload data onto the computing device 2501. The tape drive 2514 may be a quarter-inch cartridge ("QIC"), 4 mm digital audio tape ("DAT"), 8 mm digital linear tape ("DLT") drive, or other type of tape.

Furthermore, although the computing device 2501 is described above as a desktop PC, in further implementations the computing device 2501 may be a laptop, a workstation, a midrange computer, a mainframe, an embedded system, telephone, a handheld or tablet computer, a PDA, a gaming device or console, a digital picture frame, a teleconferencing device, or other type of computer.

Figure 26:
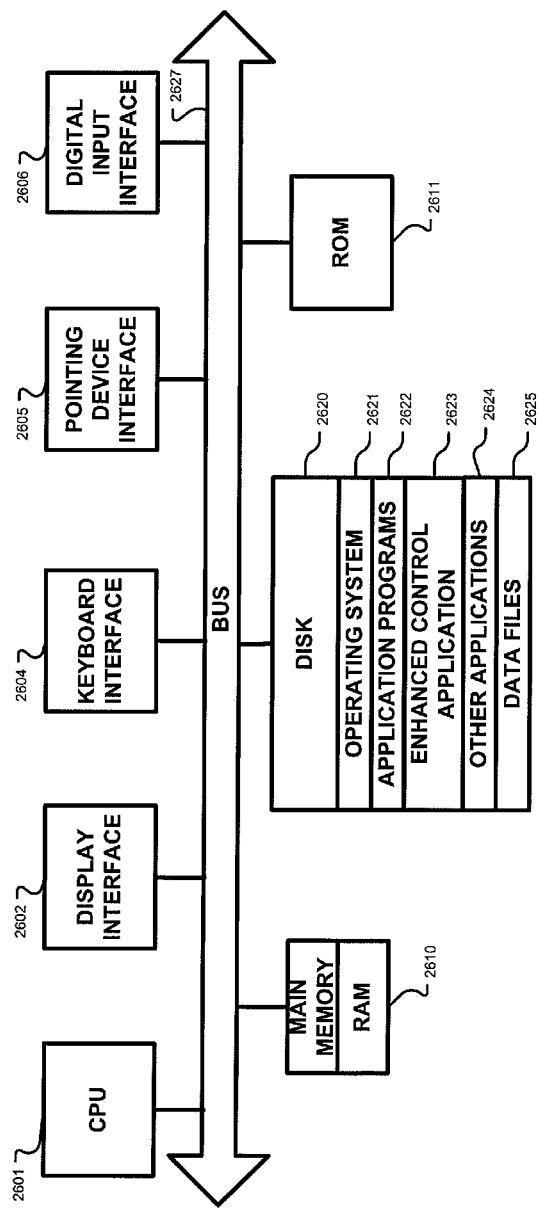
FIG. 26 is a block diagram illustrating the internal architecture of the computer shown in FIG. 25.

FIG. 26 is a block diagram illustrating the internal architecture of a computer shown in FIG. 25. An exemplary internal architecture of the computing device 2501 is now described. The computing environment includes a computer central processing unit ("CPU") 2601, where the computer instructions that make up an operating system or an application are processed; a display interface 2602 which provides a communication interface and processing functions for rendering graphics, images, and texts on the display monitor 2508; a keyboard interface 2604 which provides a communication interface to the keyboard 2509; a pointing device interface 2605 which provides a communication interface to the mouse 2510 or an equivalent pointing device; a digital input interface 2606 which provides a communication interface to the digital input device 2517; a hardcopy output device interface which provides a communication interface to the hardcopy output device; a random access memory ("RAM") 2610 where computer instructions and data are stored in a volatile memory device for processing by the computer CPU 2601; a read-only memory ("ROM") 2611 where invariant low-level systems code or data for basic system functions such as basic input and output ("I/O"), startup, or reception of keystrokes from the keyboard 2509 are stored in a non-volatile memory device; and a storage 2620 or other suitable type of memory (e.g., such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that make up an operating system 2621, application programs 2622 (including the enhanced control application 2623, and other applications 2624 as necessary) and data files 2625 are stored; a computer network interface which provides a communication interface to the network over the computer network connection. The constituent devices and the computer CPU 2601 communicate with each other over the computer bus 2627.

According to one general implementation, a computer readable medium, such as storage 2620, is encoded with a computer program. The computer program includes instructions that, when read by a machine or executed, operate to cause a data processing apparatus or computer to recognize a user's first and second gestures, and to output a control that further includes radially disposed interaction elements, at least a portion of which are associated with clusters of characters, and, when an interaction element is selected, the selected interaction element's associated characters disposed radially in relation to the selected interaction element. The computer program also includes instructions to select, using the control, the interaction element and a character associated with the selected interaction element, based on the user's recognized first and second gestures, respectively, and output the selected character.

According to another general implementation, a computer readable medium (such as storage 2620) is encoded with a computer program that includes instructions. When executed, the instructions operate to cause a computer to perform operations including recognizing a user's gesture, outputting a control that further comprises radially disposed interaction elements, each of which are associated with a character, selecting, using the control, an interaction element based on the user's recognized gesture, and outputting the character associated with the selected interaction element.

The RAM 2610 interfaces with the computer bus 2627 so as to provide quick RAM storage to the computer CPU 2601 during the execution of software programs such as the operating system application programs, and device drivers. More specifically, the computer CPU 2601 loads computer-executable process steps from the fixed disk drive 2511 or other memory media into a field of the RAM 2610 in order to execute software programs. Data is stored in the RAM 2610, where the data is accessed by the computer CPU 2601 during execution.

The computing device 2501 stores computer-executable code for an operating system 2621, application programs 2622 such as word processing, spreadsheet, presentation, gaming, or other applications. Although it is possible to output the enhanced control a user interface and enable a user to enter text, numbers, or select from the control using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 2601 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 2601 is more than one processing unit, including a multiple CPU configuration found in high-performance workstations and servers, or a multiple scalable processing unit found in mainframes.

The operating system 2621 may be MICROSOFT WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 2621 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

While FIGS. 25 and 26 illustrate one possible implementation of a computing device that executes program code, or program or process steps, configured to provide for an enhanced control that allows for a user to intuitively and easily enter text, numbers, or select from a plurality of items, other types of computers or implementations may also be used as well.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
recognizing a user's first and second gestures based on information from an image capture device;
determining a quantity and a position of interaction elements in a control such that the interaction elements may be placed to avoid covering one or more icons being displayed in a user interface;
outputting the control in the user interface based on the determined quantity and the determined position, wherein the control comprises:
the interaction elements being radially disposed, at least a portion of the interaction elements are associated with clusters of characters, wherein
the interaction elements in the control do not cover the one or more icons being displayed in the user interface, and
characters associated with a selected interaction element are disposed radially in relation to the selected interaction element when the interaction element is selected;
changing the quantity or position of the plurality of interaction elements and associated characters in the control in response to a change in quantity or position of icons being displayed in the user interface;
selecting, using the control, the interaction element and a character associated with the selected interaction element, based on the user's recognized first and second gestures, respectively; and
outputting the selected character.

2. The method of claim 1, further comprising:
displaying a representation of the user in a central region of the control,
wherein the interaction elements are radially disposed in relation to the central region.

3. The method of claim 1, wherein selecting the interaction element and the character associated with the selected interaction element using the control further comprises interacting with the control.

4. The method of claim 1, wherein each character represents an alphabetic character, a numeric character, or a symbol character.

5. The method of claim 1, wherein the interaction elements further comprise:
a first interaction element associated with alphabetic characters only;
a second interaction element associated with numeric characters only; and
a third interaction element associated with symbolic characters only.

6. The method of claim 1, wherein the radially disposed interaction elements further comprise:
a first interaction element associated with a cluster of characters, and
a second interaction element associated with a function.

7. The method of claim 1, wherein the function comprises a character deletion function or a default function.

8. The method of claim 1, wherein selecting the interaction element further comprises determining whether the user's recognized first gesture exceeds a predetermined magnitude.

9. The method of claim 1, wherein outputting the control further comprises hiding the characters associated with the selected interaction element when the users recognized first gesture moves away from the selected interaction element.

10. The method of claim 1, further comprising:
recognizing a user's third and fourth gestures;
outputting, as the control:
supplemental interaction elements disposed radially in relation to the output selected character, of which at least a portion are associated with additional clusters of characters, and,
characters associated with a selected supplemental interaction element disposed radially in relation to the selected supplemental interaction element, when the supplemental interaction element is selected;
selecting, using the control, the supplemental interaction element and one of the characters associated with the selected supplemental interaction element, based on the user's recognized third and fourth gestures, respectively; and
outputting the one of the characters associated with the selected supplemental interaction element.

11. The method of claim 10, further comprising hiding the output radially disposed interaction elements.

12. The method of claim 1, further comprising dynamically determining the characters associated with each cluster.

13. The method of claim 1, wherein the user's first gesture is recognized from images of the user.

14. The method of claim 1, wherein the user's gesture further comprises a single or multiple finger gesture; a single hand gesture; a single hand and arm gesture; a single hand and arm, and body gesture; a bimanual gesture; a change in a head pose or posture; a change in an eye position; a change in facial expression; or a change in a body pose or posture.

15. The method of claim 1, wherein the radially disposed interaction elements further comprise:
a first interaction element associated with characters: A, B, C, D, E, and F;
a second interaction element associated with characters: G, H, I, J, K, and L;
a third interaction element associated with characters: M, N, O, P, Q, and R;
a fourth interaction element associated with characters: S, T, U, V, W, and X;
a fifth interaction element associated with symbolic characters and characters: Y and Z; and
a sixth interaction element associated with a backspace function.

16. The method of claim 1, further comprising displaying, in association with each interaction element, a visual indicia of the clusters of characters associated with the each interaction element.

17. The computer-implemented method of claim 1, wherein the radially disposed elements are disposed asymmetrically.

18. The computer-implemented method of claim 1, wherein the number of characters associated with each of the radially disposed interaction elements varies with the number of radially disposed interaction elements.

19. A non-transitory computer readable medium encoded with a computer program comprising instructions that, when executed, operate to cause a computer to:
recognize a user's first and second gestures based on information from an image capture device;

determine a quantity and a position of interaction elements in a control such that the interaction elements may be placed to avoid covering one or more icons being displayed in a user interface;

output the control in a user interface based on the determined quantity and the determined position, wherein the control comprises:

the interaction elements are radially disposed, at least a portion of the interaction elements are associated with clusters of characters, wherein the interaction elements in the control do not cover the one or more icons being displayed in the user interface, and the characters associated with a selected interaction element are disposed radially in relation to a selected interaction element when the interaction element is selected;

change the quantity or position of the interaction elements and the characters in the control in response to a change in quantity or position of icons being displayed in the user interface;

determine that a character associated with the selected interaction element has been selected based on the user's recognized first and second gestures, respectively; and output the selected character.

20. A device comprising:

a user interface configured to output a control based on a determined quantity and a determined position of interaction elements, the control comprising:

radially disposed interaction elements, at least a portion of which are associated with clusters of characters, wherein the interaction elements in the control do not cover one or more icons being displayed in the user interface, and the characters associated with an interaction element are disposed radially in relation to the interaction element when the interaction element is selected; and a processor configured to:

recognize a user's first and second gestures based on information from an image capture device, determine the quantity and the position of interaction elements in the control such that the interaction elements may be placed to avoid covering the one or more icons being displayed in the user interface, change the quantity or position of the interaction elements and the characters in the control in response to a change in quantity or position of icons being displayed in the user interface, select, using the control, the interaction element and a character associated with the interaction element, based on the user's recognized first and second gestures, respectively, and output the selected character.

21. The device of claim 20, further comprising:

a camera configured to generate images of the user, wherein the user's first and second gestures are recognized from the generated images.

22. A non-transitory computer readable medium encoded with a computer program comprising instructions that, when executed, operate to cause a computer to perform operations comprising:

recognizing a user's gesture based on information from an image capture device;

determining a quantity and a position of interaction elements for display such that the interaction elements are placed to avoid covering one or more icons being displayed in a user interface;

outputting a control in a user interface based on the determined quantity and the determined position, the control further comprises radially disposed interaction elements, each of which are associated with a character, wherein the interaction elements in the control do not cover the one or more icons being displayed in the user interface;

changing the quantity or position of the interaction elements for display in response to a change in quantity or position of icons being displayed in the user interface;

selecting, using the control, an interaction element based on the user's recognized gesture; and outputting the character associated with the selected interaction element.

23. An apparatus comprising:

means for recognizing, via one or more images, a user's first and second gestures;

means for determining a quantity and a position of interaction elements in a control such that the interaction elements may be placed to avoid one or more icons being displayed in a user interface;

means for outputting the control in the user interface based on the determined quantity and the determined position, the control further comprises:

radially disposed interaction elements, at least a portion of which are associated with clusters of characters wherein the interaction elements in the control do not cover the one or more icons being displayed in the user interface, and the characters associated with a selected interaction element are disposed radially in relation to the selected interaction element when the interaction element is selected;

means for changing the quantity or position of the interaction elements and the characters in the control in response to a change in quantity or position of icons being displayed in the user interface;

means for selecting, using the control, the interaction element and a character associated with the selected interaction element, based on the user's recognized first and second gestures, respectively; and means for outputting the selected character.

24. A computer-implemented method comprising:

recognizing a user's first and second gestures based on information from an image capture device;

determining a quantity and a position of interaction elements for display such that the interaction elements are placed to avoid covering one or more icons being displayed in a user interface;

outputting a control in the user interface based on the determined quantity and the determined position, wherein the control comprises:

the interaction elements radially disposed around a single representation controlled by the user, at least a portion of the interaction elements being associated with clusters of characters, wherein the interaction elements in the control do not cover the one or more icons being displayed in the user interface, and the characters associated with a selected interaction element are disposed radially in relation to the selected interaction element when the interaction element is selected;

changing the quantity and position of the interaction elements of the control in the user interface in response to other icons being displayed in the user interface;

determining that a character associated with the selected interaction element has been selected based on the control and the user's recognized first and second gestures; and outputting the selected character.

25. The computer-implemented method of claim 24, wherein a quantity of characters associated with each of the radially disposed interaction elements varies with the quantity of radially disposed interaction elements.

* * * * *